(12) United States Patent
Zeng et al.

(10) Patent No.: US 12,235,549 B1
(45) Date of Patent: Feb. 25, 2025

(54) SPATIAL LIGHT MODULATOR AND HOLOGRAPHIC THREE-DIMENSIONAL DISPLAY DEVICE

(71) Applicant: Shanghai Tianma Micro-electronics Co., Ltd., Shanghai (CN)

(72) Inventors: Yang Zeng, Shanghai (CN); Yaodong Wu, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 18/623,269

(22) Filed: Apr. 1, 2024

(30) Foreign Application Priority Data

Dec. 29, 2023 (CN) .......................... 202311872759.4

(51) Int. Cl.
*G03H 1/22* (2006.01)
*G02B 30/25* (2020.01)
*G02F 1/1335* (2006.01)
*G02F 1/13363* (2006.01)
(Continued)

(52) U.S. Cl.
CPC .......... *G02F 1/1347* (2013.01); *G02B 30/25* (2020.01); *G02F 1/133528* (2013.01); *G02F 1/13363* (2013.01); *G02F 1/133757* (2021.01); *G02F 2413/02* (2013.01); *G02F 2413/06* (2013.01)

(58) Field of Classification Search
CPC ............. G02F 1/1347; G02F 1/133757; G02F 1/133528; G02F 1/13363; G02F 2413/02; G02F 2413/06; G02F 1/13471; G02F 1/13473; G02F 1/1357; G02F 1/133753; G02F 1/133531; G02F 1/133526; G02F 1/133631; G02F 1/133632; G02F 1/133634; G02F 1/133638; G02F 1/1337;
(Continued)

(56) References Cited

U.S. PATENT DOCUMENTS

| | | | | |
|---|---|---|---|---|
| 5,875,008 A | * | 2/1999 | Takahara | G02F 1/1334 349/8 |
| 2004/0227698 A1 | * | 11/2004 | Yamazaki | H10K 59/8791 345/32 |

(Continued)

FOREIGN PATENT DOCUMENTS

| | | |
|---|---|---|
| CN | 100360987 C | 1/2008 |
| CN | 105528119 B | 11/2018 |
| CN | 113161381 A * | 7/2021 |

(Continued)

*Primary Examiner* — Hoan C Nguyen
(74) *Attorney, Agent, or Firm* — Anova Law Group, PLLC

(57) ABSTRACT

A spatial light modulator and a holographic 3D display device are provided. The spatial light modulator includes a first liquid crystal panel configured to adjust a phase of first light; a second liquid crystal panel configured to adjust an amplitude of the first light, located on one side of the first liquid crystal panel; a quarter-wave plate located on a side of the second liquid crystal panel away from the first liquid crystal panel; and a polarizer located on a side of the quarter-wave plate away from the first liquid crystal panel. A difference between a refractive index of second liquid crystal molecules along a direction of the liquid crystal optical axis and a refractive index perpendicular to the direction of the liquid crystal optical axis is Δn, a thickness of the second liquid crystal layer is d, a wavelength of the first light is λ1, and 0.5λ1≤Δn×d≤0.75λ1.

19 Claims, 14 Drawing Sheets

(51) Int. Cl.
*G02F 1/1337* (2006.01)
*G02F 1/1347* (2006.01)

(58) Field of Classification Search
CPC ... G02F 1/133738; G02B 30/25; G02B 30/27; G02B 30/28; G02B 30/29
See application file for complete search history.

(56) References Cited

U.S. PATENT DOCUMENTS

2006/0040071 A1\* 2/2006 Oomori ............. C09K 19/2007
428/1.31
2022/0308526 A1\* 9/2022 Yu ....................... G03H 1/2294

FOREIGN PATENT DOCUMENTS

| CN | 114415486 A | \* | 4/2022 |
| JP | H0882713 A | \* | 3/1996 |
| JP | 2001194626 A | \* | 7/2001 |
| JP | 2003075800 A | \* | 3/2003 |

\* cited by examiner

SPATIAL LIGHT MODULATOR AND HOLOGRAPHIC THREE-DIMENSIONAL DISPLAY DEVICE

CROSS-REFERENCE TO RELATED APPLICATION

This application claims the priority of Chinese Patent Application No. 202318872759.4, filed on Dec. 29, 2023, the content of which is incorporated by reference in its entirety.

TECHNICAL FIELD

The present disclosure generally relates to the field of holographic three-dimensional display technologies and, more particularly, relates to a spatial light modulator and a holographic three-dimensional display device.

BACKGROUND

In three-dimensional (3D) display devices, a liquid crystal panel (LCD) is usually set up to adjust the phase and amplitude of the exiting light. The adjusted light is emitted from the polarizer, and a display from zero brightness to full brightness can be achieved. External light incident from the light-exiting side of the 3D display device is reflected at the LCD and crosstalk with the exiting light of the 3D display device, affecting the display effect. To reduce the impact of reflected light from external light on the display effect, a quarter-wave plate (also called a carved wave plate) is installed on the light-exiting side of the LCD. However, this will cause the brightness range of the exiting light of the three-dimensional display device to be reduced. It will still affect the display effect. The present disclosed spatial light modulators and holographic three-dimensional display devices are direct to solve one or more problems set forth above and other problems in the arts.

SUMMARY

One aspect of the present disclosure provides a spatial light modulator. The spatial light modulator may include a first liquid crystal panel configured to adjust a phase of first light and including a first liquid crystal layer; a second liquid crystal panel configured to adjust an amplitude of the first light, located on one side of the first liquid crystal panel, and including a second liquid crystal layer including second liquid crystal molecules having a liquid crystal optical axis; a quarter-wave plate located on a side of the second liquid crystal panel facing away from the first liquid crystal panel; and a polarizer located on a side of the quarter-wave plate facing away from the first liquid crystal panel. The second liquid crystal panel may include a first optical axis direction, a difference between a refractive index of the second liquid crystal molecules along a direction of the liquid crystal optical axis and a refractive index perpendicular to the direction of the liquid crystal optical axis is $\Delta n$, a thickness of the second liquid crystal layer is d, a wavelength of the first light is $\lambda 1$, and $0.5\lambda 1 \le \Delta n \times d \le 0.75\lambda 1$.

Another aspect of the present disclosure provides a holographic three-dimensional display device. The holographic three-dimensional display device may include a light source module configured to emit coherent light in a timed manner; a beam expansion and collimation module located on a light exiting side of the light source module and configured to expand and collimate light emitted from the light source module; a spatial light modulator located on a side of the beam expansion and collimation module facing away from the light source module; a field lens module located on a side of the spatial light modulator away from the light source module; and a liquid crystal grating module configured to bend light emitted from the field lens module in a positive and/or negative direction of a second reference direction. The spatial light modulator may include a first liquid crystal panel configured to adjust a phase of first light and including a first liquid crystal layer; a second liquid crystal panel configured to adjust an amplitude of the first light, located on one side of the first liquid crystal panel, and including a second liquid crystal layer including second liquid crystal molecules having a liquid crystal optical axis; a quarter-wave plate located on a side of the second liquid crystal panel facing away from the first liquid crystal panel; and a polarizer located on a side of the quarter-wave plate facing away from the first liquid crystal panel. The second liquid crystal panel may include a first optical axis direction, a difference between a refractive index of the second liquid crystal molecules along a direction of the liquid crystal optical axis and a refractive index perpendicular to the direction of the liquid crystal optical axis is $\Delta n$, a thickness of the second liquid crystal layer is d, a wavelength of the first light is $\lambda 1$, and $0.5\lambda 1 \le \Delta n \times d \le 0.75\lambda 1$.

Other aspects of the present disclosure can be understood by those skilled in the art in light of the description, the claims, and the drawings of the present disclosure.

BRIEF DESCRIPTION OF THE DRAWINGS

To illustrate the technical solutions in the embodiments of the present disclosure more clearly, the following briefly introduces the accompanying drawings used in the description of the embodiments. Obviously, the accompanying drawings in the following description are only some embodiments of the present disclosure, for those of ordinary skill in the art, other drawings can also be obtained from these drawings without creative effort.

DETAILED DESCRIPTION

Figure 1:
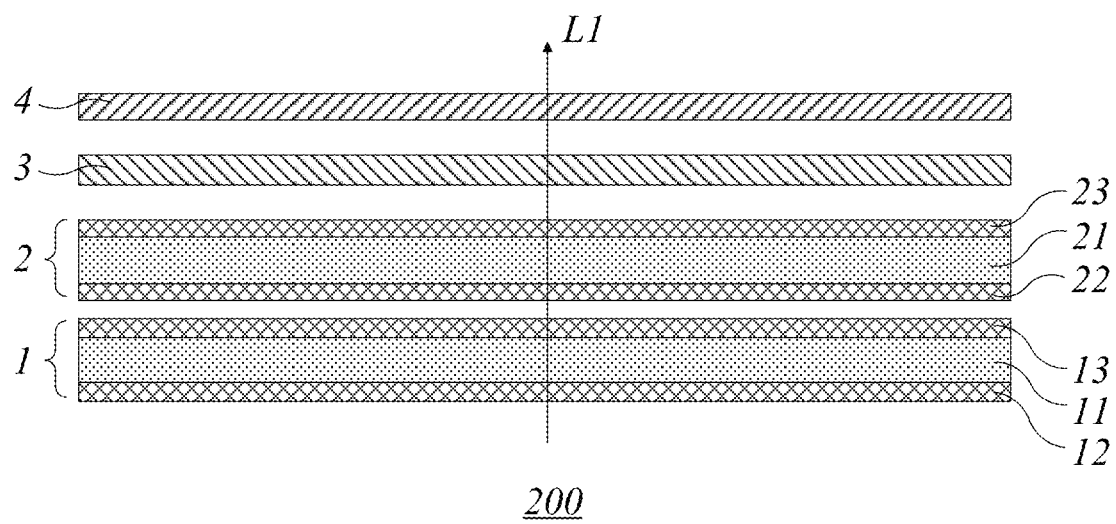
FIG. 1 illustrates an exemplary spatial light modulator according to various disclosed embodiments of the present disclosure.

Features and exemplary embodiments of various aspects of the disclosure are described in detail below. In the following detailed description, numerous specific details are set forth to provide a thorough understanding of the disclosure. However, it will be apparent to one skilled in the art that the present disclosure may be practiced without some of these specific details. The following description of embodiments is merely intended to provide a better understanding of the present disclosure by illustrating examples of the present disclosure.

It should be noted that, as long as there is no conflict, the embodiments and features in the embodiments of this disclosure can be combined with each other. The embodiments will be described in detail below with reference to the accompanying drawings.

Relational terms, such as first, or second, etc., are used only to distinguish one entity or operation from another entity or operation and do not necessarily require or imply that any such actual relationship exists between these entities or operations or order. Furthermore, the terms "comprises", "includes", or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element defined by the statement "comprising . . . " does not exclude the presence of additional identical elements in a process, method, article, or device that includes the stated element.

It will be understood that when describing the structure of components, when one layer or region is referred to as being "on" or "over" another layer or region, it may mean that it is directly on the other layer or region, or is directly on the other layer or region. There are other layers or areas between it and another layer, another area, and if the part is turned over, that layer, one area, will be "under" or "below" another layer, or area.

In addition, the term "and/or" in this disclosure is only an association relationship that describes related objects, indicating that there can be three relationships. For example, A and/or B may mean three cases: A alone exists, A and B exist simultaneously, and B alone. In addition, the character "/" in this article generally indicates that the related objects are an "or" relationship.

It should be understood that in the embodiment of the present disclosure, "B corresponding to A" may mean that B is associated with A, and B can be determined based on A. However, it should also be understood that determining B based on A does not mean determining B only based on A, B can also be determined based on A and/or other information.

It has been found that, in a three-dimensional display device, the display light emitted by the light-emitting device will adjust the phase and amplitude of the light through the spatial light modulator. The adjusted light is emitted from the polarizer, and a display from zero brightness to full brightness can be achieved. Spatial light modulators typically take the form of liquid crystal panels. The external ambient light will be incident from the light-exiting side of the three-dimensional display device, reflected at the liquid crystal panel of the spatial light modulator, and then emitted from the light-exiting side of the three-dimensional display device again. Therefore, the reflected ambient light will cross-talk with the modulated display light, affecting the display effect of the three-dimensional display device. To reduce the impact of reflected light from ambient light on the display effect, quarter-wave plates are sequentially installed on the light-exiting side of the LCD. However, the display light will be deflected after passing through the quarter-wave plate, and the transmittance of the polarizer will be affected, making the brightness range of the light after passing through the polarizer reduced, and making it difficult to meet the maximum expected transmittance and the minimum expected transmittance.

The present disclosure provides a spatial light modulator and a holographic three-dimensional display device. The spatial light modulator may include a first liquid crystal panel, a second liquid crystal panel, a quarter-wave plate and a polarizer. The first light may pass through the first liquid crystal panel, the second liquid crystal panel, the quarter-wave plate and the polarizer in sequence, and then may emit from the spatial light modulator. The external light may form polarized light after passing through the polarizer. After passing through the quarter-wave plate, the polarization direction may be rotated. After being reflected at the second liquid crystal panel, the polarization direction may be rotated again after passing through the quarter-wave plate, and may intersect the polarization directions of the polarizers, making it difficult to transmit through the polarizer, thereby reducing the impact of external light reflected on the second liquid crystal panel on the exiting light. The difference between the refractive index of the second liquid crystal molecules along the optical axis of the liquid crystal and the refractive index perpendicular to the optical axis of the liquid crystal may be $\Delta n$, the thickness of the second liquid crystal layer may be d, the wavelength of the first light may be $\lambda 1$, and $0.5\lambda 1 \leq \Delta n \times d \leq 0.75\lambda 1$. When the second liquid crystal panel adjusts the first light, the maximum brightness of the first light may be increased while keeping the minimum brightness of the first light unchanged. Thus, the display effect of the holographic three-dimensional display device may be enhanced.

Figure 2:
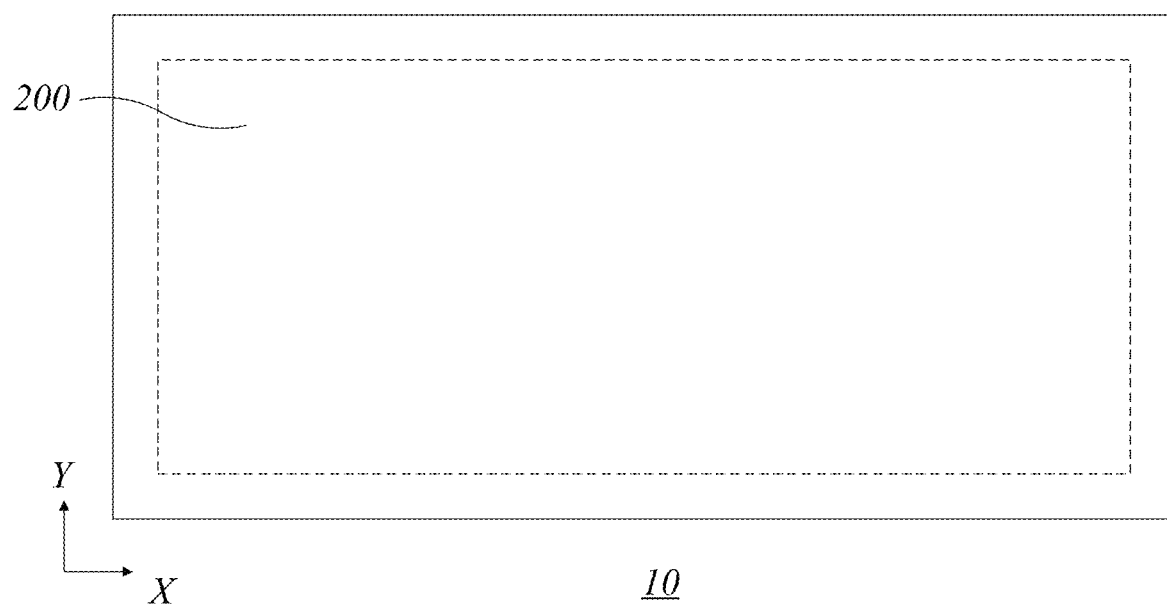
FIG. 2 illustrates an exemplary holographic three-dimensional display device including the disclosed spatial light modulator according to various disclosed embodiments of the present disclosure.

FIG. 1 illustrates a schematic structural diagram of an exemplary spatial light modulator according to various embodiments of the present disclosure. FIG. 2 illustrates a schematic structural diagram of an exemplary holographic three-dimensional display device using a spatial light modulator according to various embodiments of the present disclosure.

As shown in FIGS. 1-2, an exemplary spatial light modulator 200 of the present disclosure may include a first liquid crystal panel 1 for adjusting the phase of the first light L1. The first liquid crystal panel 1 may include a first liquid crystal layer 11. The spatial light modulator 200 may also include a second liquid crystal panel 2 configured to adjust the amplitude of the first light L1. The second liquid crystal panel 2 may be located on one side of the first liquid crystal panel 1. The second liquid crystal panel 2 may include a second liquid crystal layer 21, and the second liquid crystal layer 21 may include second liquid crystal molecules 211 having a liquid crystal optical axis. Further, the spatial light modulator 200 may include a quarter-wave plate 3 located on the side of the second liquid crystal panel 2 facing away from the first liquid crystal panel 1; and a polarizer 4 located on the side of the quarter-wave plate 3 facing away from the first liquid crystal panel 1. The second liquid crystal panel 2 may include a first optical axis direction, and the difference between the refractive index of the second liquid crystal molecules 211 in the optical axis direction of the liquid crystal and the refractive index perpendicular to the optical axis direction of the liquid crystal may be $\Delta n$, the thickness of the second liquid crystal layer 21 may be d, the wavelength of the first light L1 may be $\lambda 1$, and $0.5\lambda 1 \leq \Delta n \times d \leq 0.75\lambda 1$.

The spatial light modulator 200 in the embodiment of the present disclosure may be used to adjust the phase and amplitude of the first light L1. It should be noted that the first light L1 may not be a specific light of a specific wavelength, but generally refer to the light used for the light-emitting display. Considering that the spatial light modulator 200 of the embodiment of the present disclosure may be used in the holographic three-dimensional display device 10, the first light L1 may include, but is not limited to, red light with a wavelength of 470 nm, green light with a wavelength of 520 nm, and blue light with a wavelength of 630 nm.

In addition, considering that the spatial light modulator 200 in the embodiment of the present disclosure may be used in the holographic three-dimensional display device 10, when observing the holographic three-dimensional display device 10 directly, the observer's viewing angle may be perpendicular to the plane where the spatial light modulator 200 is located, and the observer may observe the holographic three-dimensional display device 10 using the spatial light modulator 200 from the direction of the polarizer 4. At this time, the vertical direction of the observer's viewing angle may be a first reference direction Y, and the horizontal direction may be a second reference direction X. For ease of explanation, in the embodiments of the present disclosure, among the polarization direction, alignment direction and optical axis direction mentioned, the clockwise rotation and counterclockwise rotation may be based on the viewing angle of the observer.

In the incident direction of the first light L1, the first liquid crystal panel 1, the second liquid crystal panel 2, the quarter-wave plate 3 and the polarizer 4 may be arranged in sequence. The first light L1 may sequentially transmit through the first liquid crystal panel 1, the second liquid crystal panel 2, the quarter wave plate 3 and the polarizer 4. The first light L1 emitted from the polarizer 4 may be used for the display light emission.

The phase of the first light L1 may be shifted after passing through the first liquid crystal layer 11, and the amplitude of the first light L1 may be changed after passing through the second liquid crystal layer 21. At this time, the first light L1 may be regarded as having polarized light components with different phases and amplitudes in two orthogonal directions. When passing through the quarter-wave plate 3, both polarized light components may be deflected in the polarization direction. When passing through the polarizer 4, the polarization direction of the transmitted light may be same as the polarization direction D4 of the polarizer 4, and may be used to display light emission. By adjusting the voltage difference between the electrodes on both sides of the second liquid crystal panel 2, the components of the first light L1 in two orthogonal directions may exhibit different phase differences, thereby adjusting the polarization direction of the first light L1. At the same time, to balance the phase difference introduced by the second liquid crystal panel 2, the voltage difference between the electrodes on both sides of the first liquid crystal panel 1 may also be adaptively adjusted relative to the voltage difference between the electrodes on both sides of the second liquid crystal panel 2.

In the embodiment of the present disclosure, the transmittance of the first light L1 through the polarizer 4 may be used to represent the exiting brightness of the first light L1. When the transmittance is 0%, it may mean that the display device is at a state of zero brightness. When the transmittance is 100%, it may mean that the display device is at full brightness. When the electrodes on both sides of the second liquid crystal panel 2 are at different voltage differences, the transmittance of the first light L1 through the polarizer 4 may be affected, accordingly, compared with when the quarter-wave plate 3 is not provided, the brightness of the first light L1 emitted from the polarizer 4 after passing through the polarizer 4 may be affected by the quarter-wave plate 3 and the polarizer 4. To allow the display device to display normally, the minimum brightness of the first light L1 emitted from the polarizer 4 may need to reach 0%, and the highest brightness may need to reach 50%.

For the first light L1 being red light with a wavelength of 470 nm, green light with a wavelength of 520 nm and blue light with a wavelength of 630 nm respectively, and $\Delta n \times d$ being different times of the wavelength $\lambda 1$, different voltage differences may be respectively applied to the second liquid crystal layer 21 such that the first light L1 may exhibit different phase differences in the optical axis direction of the liquid crystal molecules and in the direction perpendicular to the optical axis of the liquid crystal molecules. The transmittance of the first light L1 after it exits the polarizer 4 may be detected, and the curve of the transmittance of different lights and the phase delay generated by the second liquid crystal panel 2 may be plotted.

Figure 3:
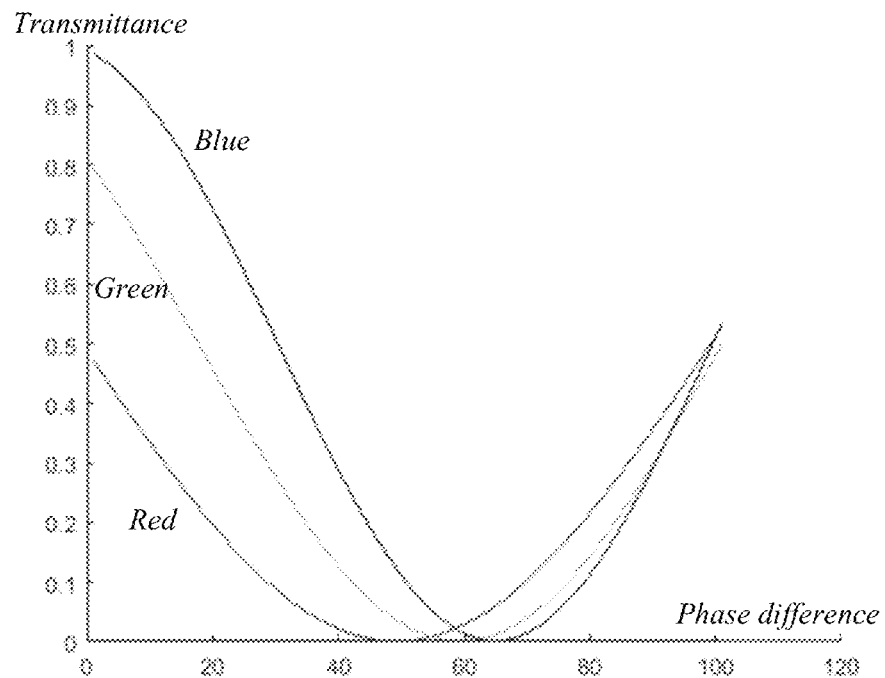
FIG. 3 illustrates an exemplary curve of transmittance vs different phase differences of a second liquid crystal layer of an exemplary spatial light modulator according to various disclosed embodiments of the present disclosure.
Figure 4:
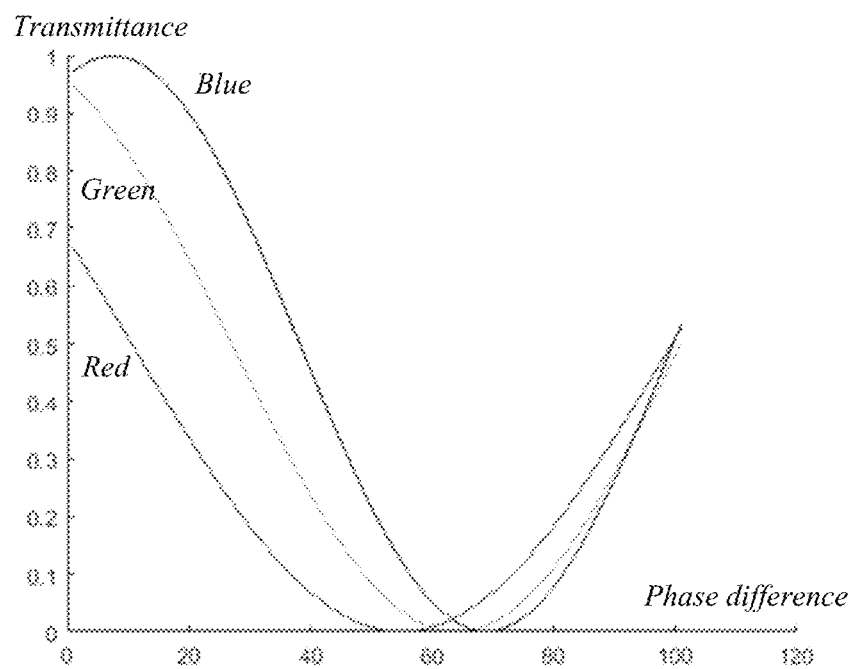
FIG. 4 illustrates another exemplary curve of light transmittance vs different phase differences of a second liquid crystal layer of an exemplary spatial light modulator according to various disclosed embodiments of the present disclosure.
Figure 5:
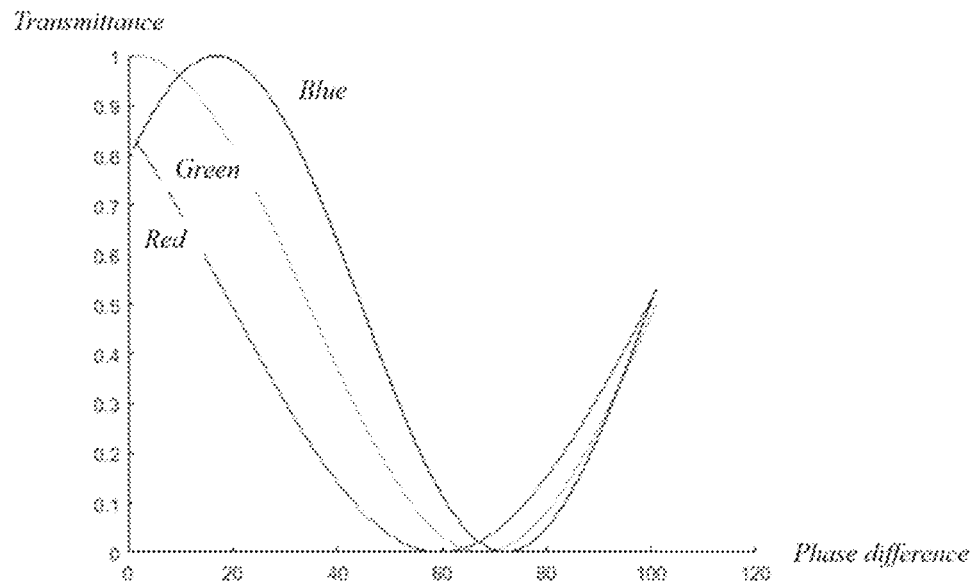
FIG. 5 illustrates another exemplary curve of light transmittance vs different phase differences of a second liquid crystal layer of an exemplary spatial light modulator according to various disclosed embodiments of the present disclosure.
Figure 6:
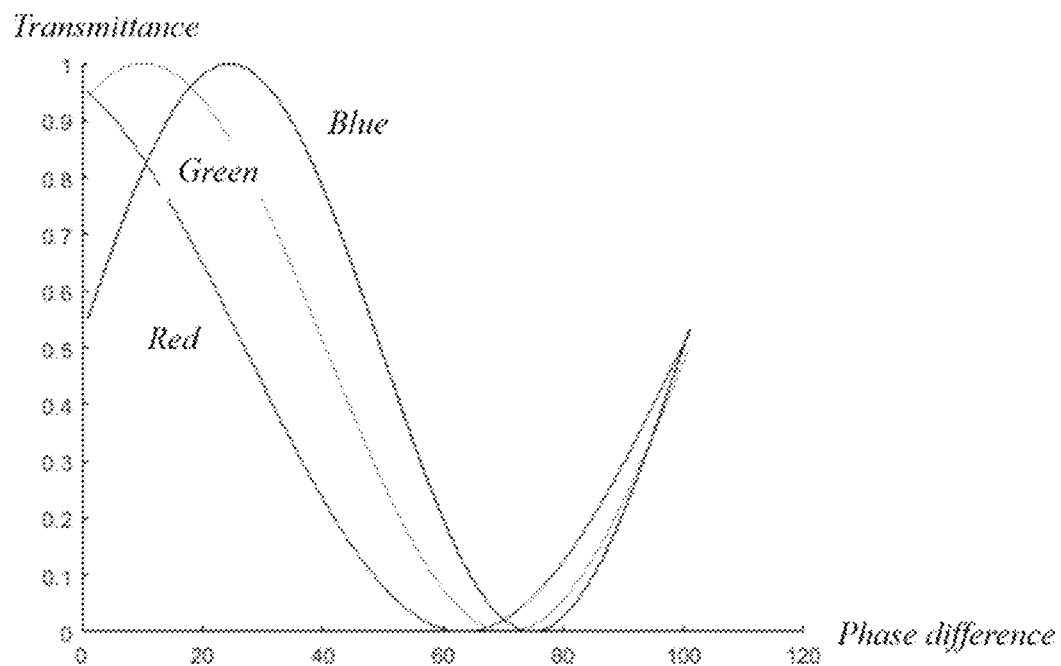
FIG. 6 illustrates another exemplary curve of light transmittance vs different phase differences of a second liquid crystal layer of an exemplary spatial light modulator according to various disclosed embodiments of the present disclosure.
Figure 7:
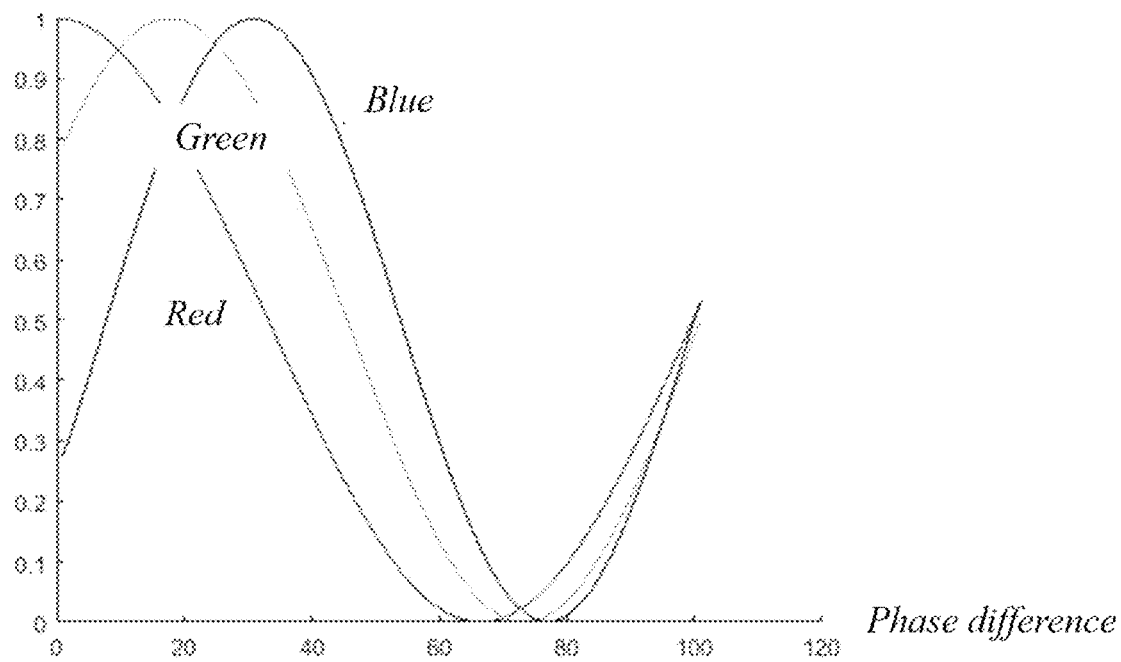
FIG. 7 illustrates another exemplary curve of light transmittance vs different phase differences of a second liquid crystal layer of an exemplary spatial light modulator according to various disclosed embodiments of the present disclosure.

FIG. 3 is an exemplary curve showing the transmittance of light corresponding to different phase differences in the second liquid crystal layer of the spatial light modulator according to various disclosed embodiments of the present disclosure. FIG. 4 is an exemplary curve showing the transmittance of light corresponding to different phase differences in the second liquid crystal layer of the spatial light modulator according to various disclosed embodiments of the present disclosure. FIG. 5 is another exemplary curve showing the transmittance of light corresponding to different phase differences in the second liquid crystal layer of the spatial light modulator according to various disclosed embodiments of the present disclosure. FIG. 6 is another exemplary curve showing the transmittance of light corresponding to different phase differences in the second liquid crystal layer of the spatial light modulator according to various disclosed embodiments of the present disclosure. FIG. 7 is another exemplary curve showing the transmittance of light corresponding to different phase differences in the second liquid crystal layer of the spatial light modulator according to various disclosed embodiments of the present disclosure.

As shown in FIG. 3, when $\Delta n \times d = 0.5\lambda 1$, the minimum transmittance of red light, green light and blue light may reach 0%, and the maximum transmittance of red light, green light and blue light may reach 50%, the holographic three-dimensional display device 10 may be capable of displaying light emission.

As shown in FIG. 4, when $\Delta n \times d = 0.5625\lambda 1$, the minimum transmittance of red light, green light and blue light may reach 0%, and the maximum transmittance of red light, green light and blue light may reach 60%, the holographic three-dimensional display device 10 may be capable of displaying light emission.

As shown in FIG. 5, when $\Delta n \times d = 0.625\lambda 1$, the minimum transmittance of red light, green light and blue light may reach 0%, and the maximum transmittance of red light, green light and blue light may reach 80%, the holographic three-dimensional display device 10 may be capable of displaying light emission.

As shown in FIG. 6, when $\Delta n \times d = 0.6875\lambda 1$, the minimum transmittance of red light, green light and blue light may reach 0%, and the maximum transmittance of red light, green light and blue light may reach 90%, the holographic three-dimensional display device 10 may be capable of displaying light emission.

As shown in FIG. 7, when $\Delta n \times d = 0.75\lambda 1$, the minimum transmittance of red light, green light and blue light may reach 0%, and the maximum transmittance of red light, green light and blue light may reach 100%, the holographic three-dimensional display device 10 may be capable of displaying light emission.

Therefore, when $0.5\lambda 1 \leq \Delta n \times d \leq 0.75\lambda 1$, the holographic three-dimensional display device 10 using the spatial light modulator 200 of the embodiment of the present disclosure may display normally.

When external ambient light enters the spatial light modulator 200 of the embodiment of the present disclosure from the polarizer 4, the ambient light becomes polarized light. After the ambient light passes through the quarter-wave plate 3, the polarization direction of the ambient light may be rotated. After the ambient light is reflected by the second liquid crystal panel 2, it may pass through the quarter-wave plate 3 again, and the polarization direction of the ambient light may be rotated again, thus intersecting with the polarization direction D4 of the polarizer 4, reducing the amount of ambient light in the polarizer 4. Accordingly, the crosstalk of ambient light to the first light L1 may be reduced, and the display effect of the holographic three-dimensional display device 10 using the spatial light modulator 200 of the embodiment of the present application may be improved.

In some embodiments, when $0.625\lambda 1 \leq \Delta n \times d \leq 0.7\lambda 1$, the minimum transmittance of red light, green light and blue light may reach 0%, and the maximum transmittance of red light, green light and blue light may reach 80%, the holographic three-dimensional display device 10 using the spatial light modulator 200 of the embodiment of the present disclosure may have desired display effects.

When $0.625\lambda 1 > \Delta n \times d$, the maximum transmittance of red light may be significantly lower than that of green light and blue light. Therefore, although the holographic three-dimensional display device 10 using the spatial light modulator 200 of the embodiment of the present application may display normally, the display effect may be affected to a certain extent.

When $0.7\lambda 1 < \Delta n \times d$, the minimum transmittance of red light, green light and blue light may reach 0%, and the maximum transmittance of red light, green light and blue light may reach 100%, but when the second liquid crystal layer 21 is under different voltage differences, the transmittance of blue light changes for more than one period. Therefore, when the phase difference of the first light L1 in the second liquid crystal layer 21 changes, the transmittance of blue light may be changed significantly, which may be not conducive to the precise control of the transmission of blue light.

Figure 8:
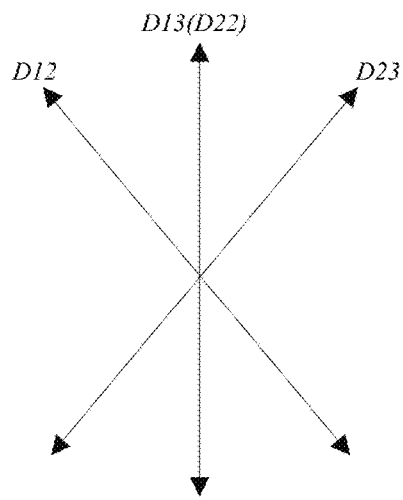
FIG. 8 illustrates a first orientation direction, a second orientation direction, a third orientation direction, and a fourth orientation.

FIG. 8 is a schematic diagram of the first alignment direction, the second alignment direction, the third alignment direction and the fourth alignment direction. In some embodiments, as shown in FIG. 8 and FIG. 1, the first liquid crystal panel 1 may further include a first alignment film 12 with a first alignment direction D12 and a second alignment film 13 with a second alignment direction D13. The first alignment film 12 and the second alignment film 13 may be respectively located on both sides of the first liquid crystal layer 11. The second alignment direction D13 may be parallel to the first reference direction Y. The second liquid crystal panel 2 may also include a third alignment layer 22 having a third alignment direction D22 and a fourth alignment film 23 having a fourth alignment direction D23. The fourth alignment film 23 may be located on the side of the third alignment film 22 facing away from the second alignment film 13. The angle between the second alignment direction D13 and the fourth alignment direction D23 may be approximately 45°.

Considering that the spatial light modulator 200 of the embodiment of the present disclosure may be used in the holographic three-dimensional display device 10, when the holographic three-dimensional display device 10 is viewed from the front, the vertical direction of the observer's viewing angle may be the first reference direction Y.

The first alignment film 12 and the second alignment film 13 may be used to limit the rotation direction of the liquid crystal molecules in the first liquid crystal layer 11 such that the rotation direction of the liquid crystal molecules may gradually change along the thickness direction of the first liquid crystal layer 11 to adjust the phase of the first light L1. The third alignment film 22 and the fourth alignment film 23 may be used to limit the rotation direction of the liquid crystal molecules in the second liquid crystal layer 21. To allow the light emitted from the first liquid crystal panel 1 to enter the second liquid crystal panel 2, the second alignment direction D13 and the third alignment direction D22 may need to be parallel, and the angle between the second alignment direction D13 and the fourth alignment direction D23 may be approximately 45°. Therefore, the angle between the third alignment direction D22 and the fourth alignment direction D23 may be approximately 45° such that, along the thickness direction of the second liquid crystal layer 21, the rotation direction of the liquid crystal molecules may gradually change to achieve the purpose of adjusting the amplitude of the first light L1. The angle between the first alignment direction D12 and the second alignment direction D13 may not be limited, for example, it may be approximately 45°.

Figure 9:
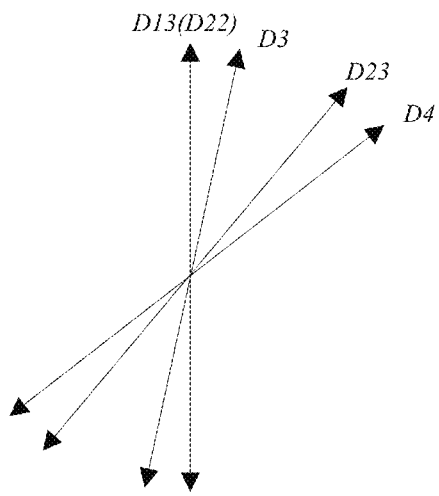
FIG. 9 illustrates a second orientation direction, a fourth orientation, a direction of an optical axis of a quarter-wave plate and a polarization direction of a polarizer.
Figure 10:
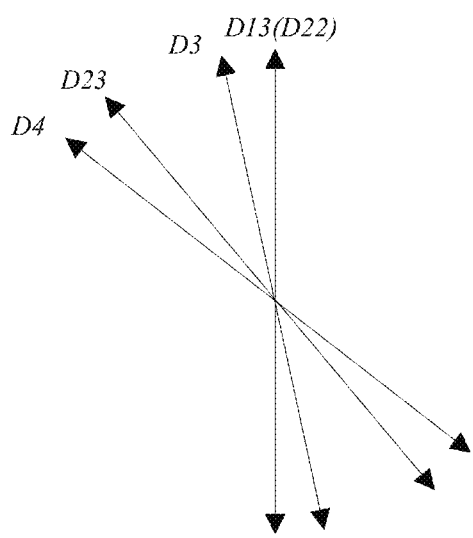
FIG. 10 illustrates a second orientation direction, a fourth orientation, a direction of an optical axis of a quarter-wave plate and a polarization direction of a polarizer.

FIG. 9 is an exemplary schematic diagram of the second alignment direction, the fourth alignment direction, the optical axis direction of the quarter-wave plate and the polarization direction of the polarizer according to various disclosed embodiments of the present disclosure. FIG. 10 is another exemplary schematic diagram of the second alignment direction, the fourth alignment direction, the optical axis direction of the quarter-wave plate, and the polarization direction of the polarizer according to various disclosed embodiments of the present disclosure.

In some embodiments, as shown in FIG. 9 and FIG. 10, the angle between the optical axis direction D3 of the quarter-wave plate and the polarization direction D4 of the polarizer 4 may be approximately 45°.

When external ambient light enters the spatial light modulator 200 of the embodiment of the present application from the polarizer 4, the ambient light may become polarized light. After the ambient light passes through the quarter-wave plate 3, the polarization direction of the ambient light may be rotated approximately 45°. After the ambient light is reflected by the second liquid crystal panel 2, it may pass through the quarter-wave plate 3 again, and the polarization direction of the ambient light may be rotated 45° again, thus being perpendicular to the polarization direction D4 of the polarizer 4. Accordingly, the transmittance of the ambient light at the polarizer 4 may approach approximately 0%, thereby greatly reducing the crosstalk of the ambient light to the first light L1, and significantly improving the display performance of the holographic three-dimensional display device 10 using the spatial light modulator 200.

In some embodiments, the first liquid crystal panel 1 may further include a first alignment film 12 with a first alignment direction D12 and a second alignment film 13 with a second alignment direction D13. The first alignment film 12 and the second alignment film 13 may be respectively located on both sides of the first liquid crystal layer 11. The second alignment direction D13 may be parallel to the first reference direction Y. The angle between the optical axis direction D3 of the quarter-wave plate 3 and the second alignment direction D13 may be approximately 30°, and the angle between the polarization direction D4 of the polarizer 4 and the second alignment direction D13 may be approximately 15°.

The angle between the optical axis direction D3 of the quarter-wave plate 3 and the second alignment direction D13 may be approximately 30°, and the angle between the polarization direction D4 of the polarizer 4 and the second alignment direction D13 may be approximately 15°, which may make the spatial light modulator 200, on the basis of improving the display effect of the holographic three-dimensional display device 10, reduce the crosstalk of the ambient light to the first light L1. Considering that the angle between the optical axis direction D3 of the quarter-wave plate 3 and the polarization direction D4 of the polarizer 4 may be approximately 45°, the optical axis direction D3 of the quarter-wave plate 3 may be regarded as being rotated 30° clockwise relative to the second alignment direction D13, and the polarization direction D4 of the polarizer 4 may be regarded as being rotated 15° clockwise relative to the optical axis direction D3 of the quarter-wave plate 3. At the same time, the polarization direction D4 of the polarizer 4 may be regarded as being rotated 45° clockwise relative to the second alignment direction D13. Alternatively, the optical axis direction D3 of the quarter-wave plate may be regarded as being rotated counterclockwise by 30° relative to the second alignment direction D13, and the polarization direction D4 of the polarizer 4 may be regarded as being rotated counterclockwise by 15° relative to the optical axis D3 of the quarter-wave plate 3. At the same time, the polarization direction D4 of the polarizer 4 may be regarded as being rotated counterclockwise by 45° relative to the second alignment direction D13.

In some embodiments, the central wavelength range of the quarter-wave plate 3 may be in a range of approximately 495 nm-605 nm.

The quarter-wave plate 3 may rotate the polarization direction of the first light L1. When the wavelength of the light is within the central wavelength range of the quarter-wave plate 3, the rotation angles of the polarization directions of light of different wavelengths may be basically the same. At this time, the quarter-wave plate 3 may affect the brightness of the light of different wavelengths (colors) to the same degree, which may reduce the display color difference of the holographic three-dimensional display device 10 using the spatial light modulator 200.

In some embodiments, the wavelength $\lambda 1$ of the first light L1 may satisfy 495 nm-$\Delta\lambda \le \lambda 1 \le$ 605 nm+$\Delta\lambda$. $\Delta\lambda$ may be the first wavelength deviation.

When the wavelength of the light is outside the central wavelength range of the quarter-wave plate 3, if the difference between the wavelength of the light and the upper or lower limit of the central wavelength range is within the allowable range, the rotation angle of the polarization direction of the light may also be considered, as well as the rotation angle of the polarization direction of the light whose wavelength is within the central wavelength range of the quarter-wave plate 3, may have no much difference. Accordingly, the holographic three-dimensional display device 10 using the spatial light modulator 200 may have obvious color difference.

For example, $\Delta\lambda=25$ nm, the first light L1 may be red light with a wavelength of 470 nm, green light with a wavelength of 520 nm, and blue light with a wavelength of 630 nm. The green light with a wavelength of 520 nm is located within the central wavelength range of the quarter-wave plate 3, the difference between the red light with a wavelength of 470 nm and the lower limit 495 nm of the central wavelength range of the quarter-wave plate 3 may be 25 nm, and the difference between the blue light of a wavelength of 630 nm and the upper limit 605 nm of the central wavelength range of the quarter-wave plate 3 may be 25 nm, it may be considered that the quarter-wave plate 3 may affect the brightness of light of different wavelengths (colors) to the same degree, which may reduce the problem of display color difference of the holographic three-dimensional display device 10 using the spatial light modulator 200.

It should be noted that when the holographic three-dimensional display device 10 using the spatial light modulator 200 emits light, different pixels may use different colors of light and may correspond to different wavelengths. When determining the central wavelength range of the quarter-wave plate 3, the wavelengths of different light may be located within the central wavelength range as much as possible. If the central wavelength range of the quarter-wave plate 3 is difficult to cover the wavelengths of all different lights, for wavelengths located outside of the central wavelength range of the quarter-wave plate 3, the difference between the wavelength of light outside the central wavelength range of the quarter-wave plate 3 and the upper or lower limit of the central wavelength range of the quarter-wave plate 3 should be as small as possible.

Figure 11:
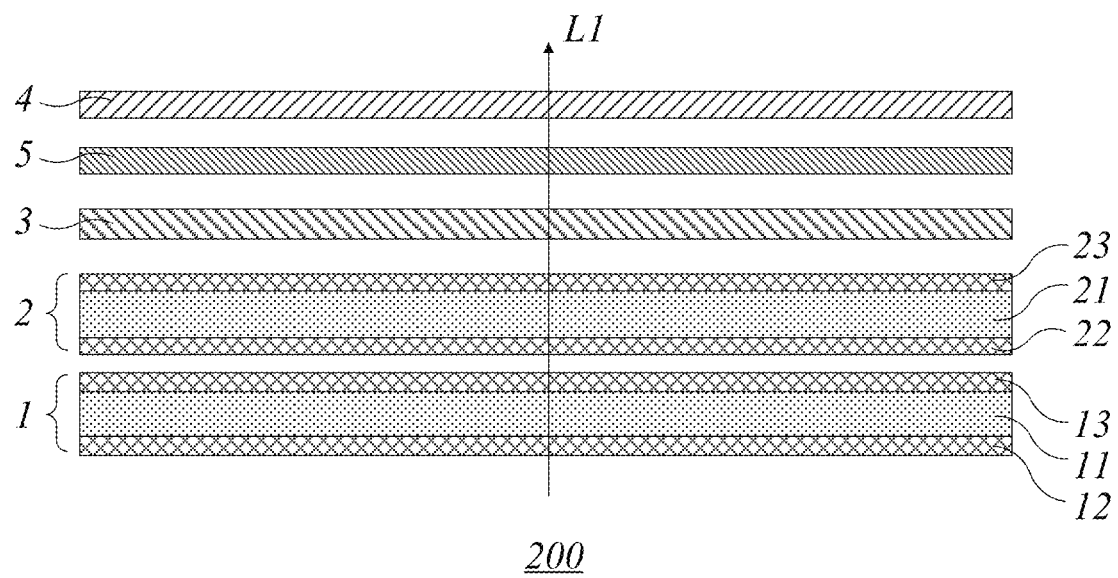
FIG. 11 illustrates another exemplary spatial light modulator according to various disclosed embodiments of the present disclosure.

FIG. 11 is a schematic structural diagram of another exemplary spatial light modulator according to various disclosed embodiments of the present disclosure. In some embodiments, as shown in FIG. 11, the spatial light modulator 200 may also include a half-wave plate 5. The half-wave plate 5 may be disposed on the quarter-wave plate 3 and the polarizer 4.

After the first light L1 is emitted from the second liquid crystal panel 2, it may pass through the quarter-wave plate 3, and the polarization direction of the first light L1 may be rotated. After passing through the half-wave plate 5, the polarization direction of the first light L1 may be rotated again and then emitted from the polarizer 4. When the holographic three-dimensional display device 10 using the spatial light modulator 200 uses red light with a wavelength of 470 nm, green light with a wavelength of 520 nm, and blue light with a wavelength of 630 nm to display light emission, the wavelength of the red light and the blue light may be both outside the central wavelength range of the quarter-wave plate 3. After setting the half-wave plate 5, the red light and blue light may be reversely compensated to further reduce the influence of the quarter-wave plate 3 on the brightness of red light and blue light to further reduce the display chromatic aberration of the holographic three-dimensional display device 10.

It should be noted that, similar to the quarter-wave plate 3, the central wavelength range of the half-wave plate 5 may also be approximately 495 nm-605 nm.

Figure 12:
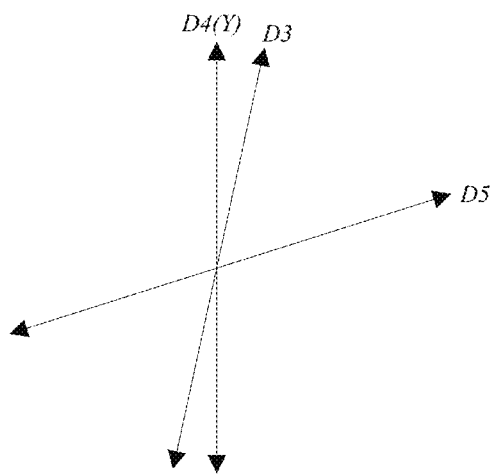
FIG. 12 illustrates a direction of an optical axis of a quarter-wave plate, a direction of an optical axis of a half-wave plate and a polarization direction of a polarizer.
Figure 13:
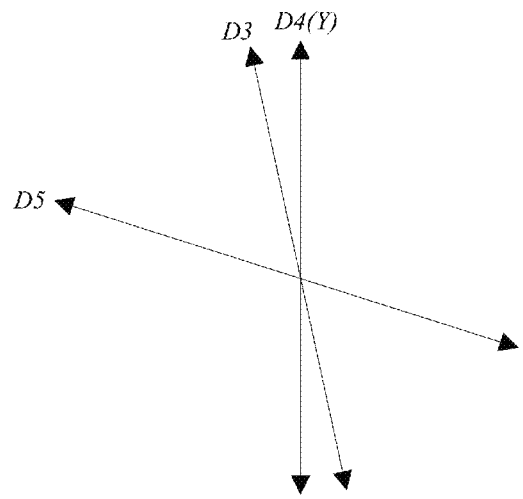
FIG. 13 illustrates a direction of an optical axis of a quarter-wave plate, a direction of an optical axis of a half-wave plate and a polarization direction of a polarizer.
Figure 14:
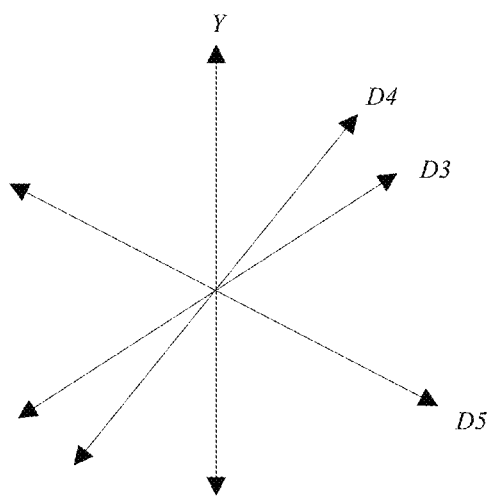
FIG. 14 illustrates a direction of an optical axis of a quarter-wave plate, a direction of an optical axis of a half-wave plate and a polarization direction of a polarizer.
Figure 15:
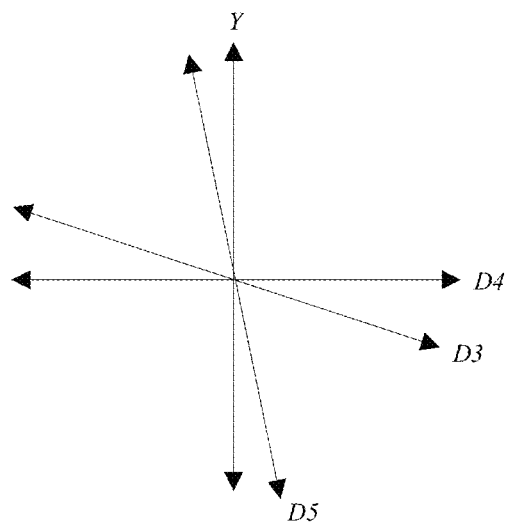
FIG. 15 illustrates a direction of an optical axis of a quarter-wave plate, a direction of an optical axis of a half-wave plate and a polarization direction of a polarizer.
Figure 16:
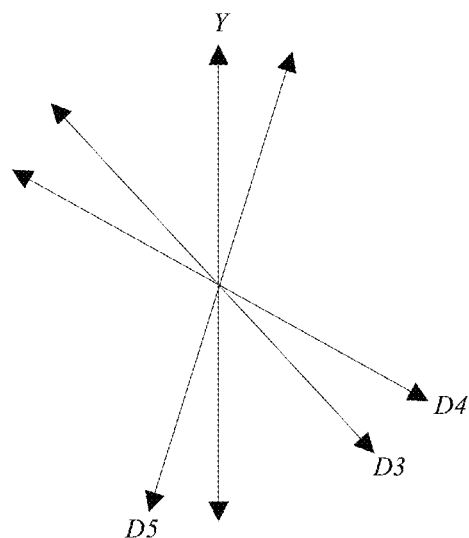
FIG. 16 illustrates a direction of an optical axis of a quarter-wave plate, a direction of an optical axis of a half-wave plate and a polarization direction of a polarizer.
Figure 17:
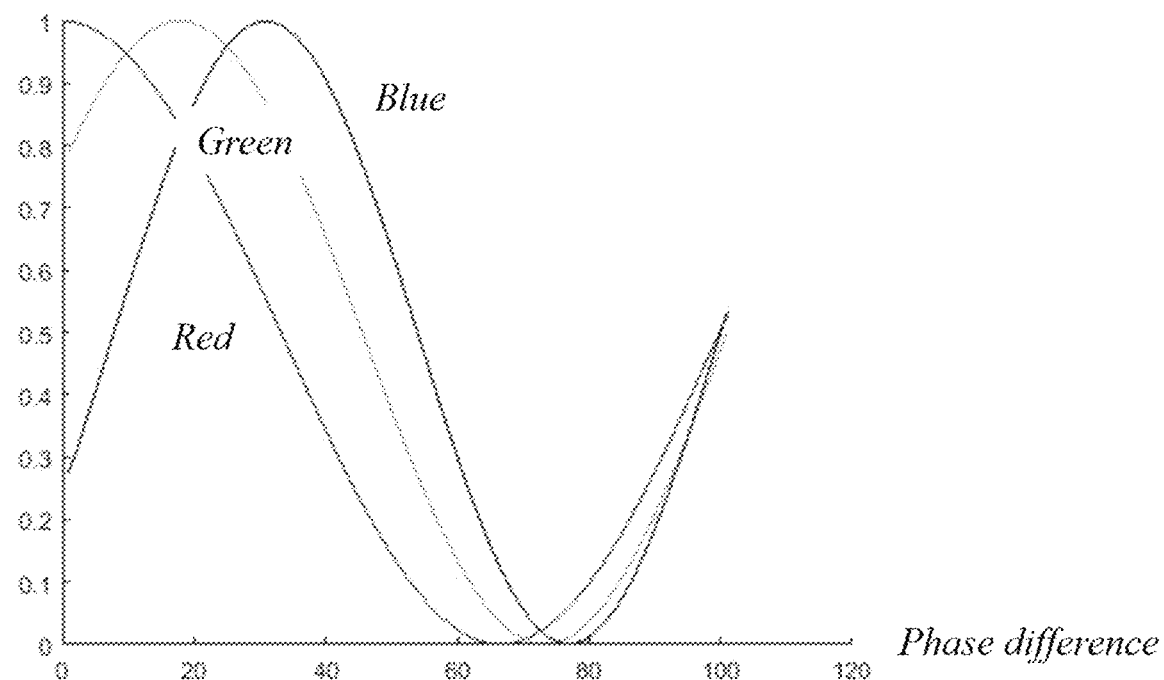
FIG. 17 illustrates another exemplary curve of light transmittance vs different phase differences of a second liquid crystal layer of an exemplary spatial light modulator according to various disclosed embodiments of the present disclosure.

FIG. 12 is an exemplary schematic diagram of the optical axis direction of the quarter-wave plate, the optical axis direction of the half-wave plate and the polarization direction of the polarizer. FIG. 13 is another exemplary schematic diagram of the optical axis direction of the quarter-wave plate, the optical axis direction of the half-wave plate and the polarization direction of the polarizer. FIG. 14 is another exemplary schematic diagram of the optical axis direction of the quarter-wave plate, the optical axis direction of the half-wave plate and the polarization direction of the polarizer. FIG. 15 is another exemplary schematic diagram of the optical axis direction of the quarter-wave plate, the optical axis direction of the half-wave plate and the polarization direction of the polarizer. FIG. 16 is another exemplary schematic diagram of the optical axis direction of the quarter-wave plate, the optical axis direction of the half-wave plate and the polarization direction of the polarizer. FIG. 17 is another exemplary curve showing the transmittance of light corresponding to different phase differences in the second liquid crystal layer of the spatial light modulator according to various disclosed embodiments of the present disclosure.

In some embodiments, as shown in FIGS. 12-17, the angle between the optical axis direction D3 of the quarter-wave plate 3 and the polarization direction D4 of the polarizer 4 may be approximately 15°, and the angle between the optical axis direction D5 of the half-wave plate 5 and the polarization direction D4 of the polarizer 4 may be approximately 75°.

In one embodiment of the present disclosure, the polarization direction D4 of the polarizer 4 may not be limited. For example, the angle between the polarization direction D4 of the polarizer 4 and the second alignment direction D13 may be 0°, 45° or 90°, for example, the integer time of 45°. After the ambient light passes through the half-wave plate 5 and the quarter-wave plate 3, it may be reflected at the second liquid crystal panel 2 and pass through the quarter-wave plate 3 and the half-wave plate 5 again. When the angle between the polarization direction D4 of the polarizer 4 and the second alignment direction D13 is an integer time of 45°, it may be convenient to set the optical axis direction D3 of the quarter-wave plate 3 and the optical axis direction D5 of the half-wave plate 5 such that the polarization direction of the ambient light after the reflection may be perpendicular to the polarization direction D4 of the polarizer 4, thereby reducing the crosstalk of the ambient light to the first light L1.

The optical axis direction D3 of the quarter-wave plate 3 may be regarded as being rotated 15° clockwise with respect to the polarization direction D4 of the polarizer 4, and the optical axis direction D5 of the half-wave plate 5 may be regarded as being rotated 75° clockwise with respect to the polarization direction D4 of the polarizer 4. Alternatively, the optical axis direction D3 of the quarter-wave plate 3 may be regarded as being rotated 15° counterclockwise relative to the polarization direction D4 of the relative polarizer 4, and the optical axis direction D5 of the half-wave plate 5 may be regarded as being rotated 75° counterclockwise relative to the polarization direction D4 of the polarizer 4.

For example, $\Delta n \times d = 0.75\lambda 1$, and the polarization direction D4 of the polarizer 4 may be rotated clockwise by 0°, 45°, 90° or 135° relative to the second alignment direction D13, and the optical axis direction D3 of the quarter-wave plate 3 may be regarded as being rotated 15° clockwise relative to the polarization direction D4 of the polarizer 4, and the optical axis direction D5 of the half-wave plate 5 may be regarded as being rotated 75° clockwise relative to the polarization direction D4 of the polarizer 4. In the above four examples, when the first light L1 produces different phase differences in the second liquid crystal layer 21, the transmittance of the lights of different colors after exiting the polarizer 4 may be detected and corresponding curves may be plotted. The curves of the four examples may be basically the same. For example, the minimum transmittance of red light, green light and blue light may be able to reach 0%, and the maximum transmittance of red light, green light and blue light may be able to reach 100%. Thus, the holographic three-dimensional display device 10 may display light emission.

In some embodiments, referring to FIGS. 12-17, the angle between the optical axis direction D3 of the quarter-wave plate 3 and the polarization direction D4 of the polarizer 4 may be approximately 75°, and the angle between the optical axis direction D5 of the half-wave plate 5 and the polarization direction D4 of the polarizer 4 may be approximately 75°.

Similarly, the optical axis direction D3 of the quarter-wave plate 3 may be regarded as being rotated 75° clockwise relative to the polarization direction D4 of the polarizer 4, and the optical axis direction D5 of the half-wave plate 5 may be regarded as being rotated 15° clockwise relative the polarization direction D4 of the polarizer 4. Alternatively, the optical axis direction D3 of the quarter-wave plate 3 may be regarded as being rotated 75° counterclockwise relative to the polarization direction D4 of the relative polarizer 4, and the optical axis direction D5 of the half-wave plate 5 may be regarded as being rotated 15° counterclockwise relative to the polarization direction D4 of the relative polarizer 4. Accordingly, the minimum transmittance and maximum transmittance of red light, green light and blue light may enable the holographic three-dimensional display device 10 to display light emission.

Figure 18:
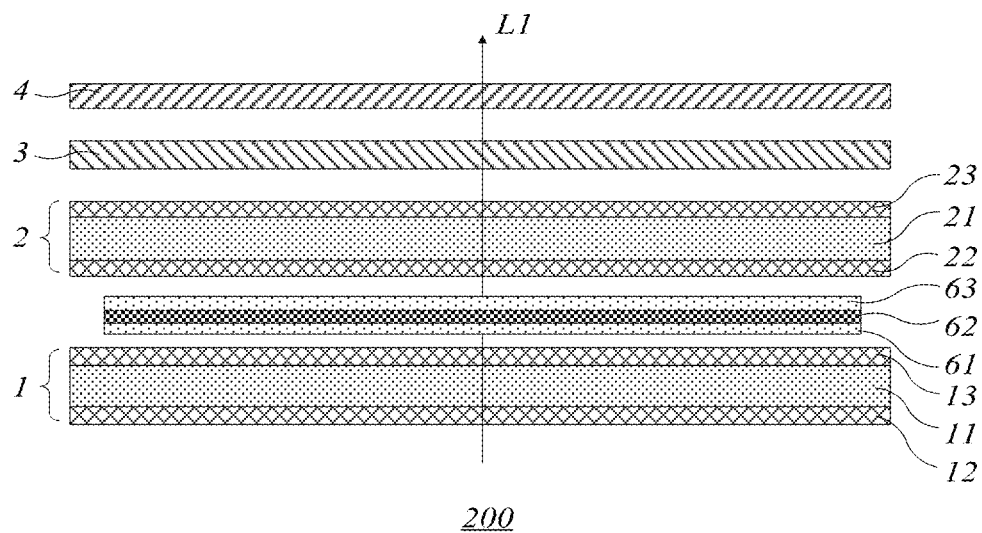
FIG. 18 illustrates another exemplary spatial light modulator according to various disclosed embodiments of the present disclosure.

FIG. 18 is a schematic structural diagram of another exemplary spatial light modulator according to various embodiments of the present disclosure. As shown in FIG. 18, In some embodiments, the spatial light modulator 200 may also include a first color resistor layer 61 disposed between the first liquid crystal panel 1 and the second liquid crystal panel 2, a connection layer 62 disposed between the first color resistor layer 61 and the second liquid crystal panel 2; and a second color resistor layer 63 disposed between the connection layer 62 and the second liquid crystal panel 2.

The first color resistor layer 61 and the second color resistor layer 63 may be used to reduce crosstalk between lights of different colors and at the same time to reduce the possibility of external ambient light transmitting through the second liquid crystal panel 2. The connection layer 62 may be configured to connect the first color resistor layer 61 and the second color resistor layer 63 such that they may form an integral body.

Figure 19:
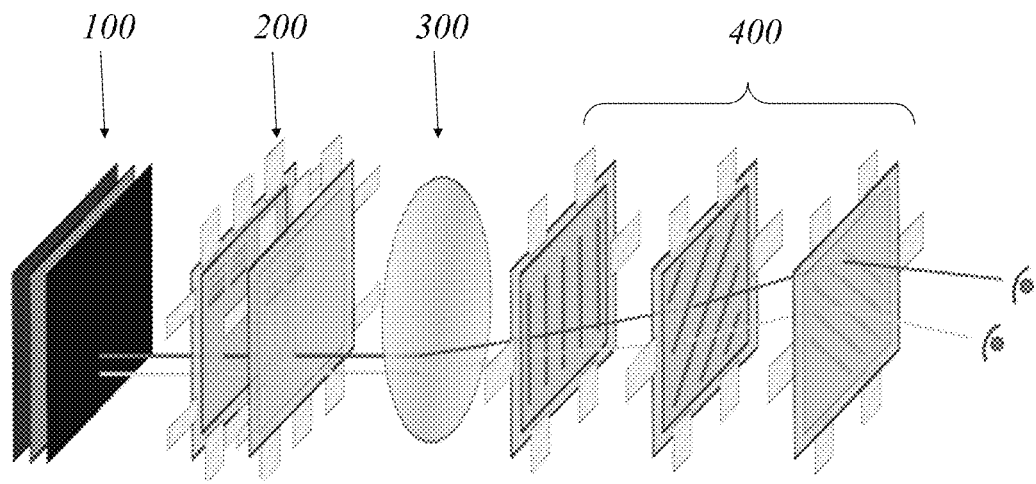
FIG. 19 illustrates an exemplary holographic three-dimensional display device according to various disclosed embodiments of the present disclosure.

The present disclosure also provides a holographic three-dimensional display device. FIG. 19 is a structural diagram of an exemplary holographic three-dimensional display device according to various disclosed embodiments of the present disclosure. As shown in FIG. 19, a holographic three-dimensional display device 10 may include a light source module 100 for emitting coherent light in a timed sequence; and a beam expansion and collimation module located on the light-exiting side of the light source module 100. The beam expansion and collimation module may be configured to expand and collimate the light emitted from the light source module 100. The holographic three-dimensional display device 10 may also include a spatial light modulator 200. The spatial light modulator 200 may be a present disclosed spatial light modulator described above. The spatial light modulator 200 may be located on a side of the beam expansion and collimation module away from the light source module 100. Further, the holographic three-dimensional display device may include a field lens module 300 located on the side of the spatial light modulator 200 away from the light source module 100, and a liquid crystal grating module 400 used to direct the light emitted by the field lens module 300 toward the positive direction or the negative direction of the second reference direction X. The second reference direction X may be perpendicular to the first reference direction Y.

It should be emphasized that when observing the holographic three-dimensional display device 10 from the normal direction, the observer's viewing angle may be perpendicular to the plane where the spatial light modulator 200 is located, and the observer may observe the holographic three-dimensional display device 10 including the spatial light modulator 200 from the direction of the polarizer 4. At this time, the vertical direction of the observer's viewing angle may be the first reference direction Y, and the horizontal direction may be the second reference direction X. For example, the positive direction of the second reference direction X may be the left side of the observer, and the negative direction of the second reference direction X may be the right side of the observer. In addition, in the polarization direction, the alignment direction and the optical axis direction, clockwise rotation and counterclockwise rotation may be based on the observer's perspective.

The light source module 100 may be configured to emit coherent light in a timed manner. The emitted light may include two components in orthogonal directions, and the phase difference between the two components may remain consistent. The beam expansion and collimation module may be configured to expand and collimate the light emitted from the light source module 100 such that coherent light may be incident into the spatial light modulator 200 in parallel. After the adjustment by the spatial light modulator 200, the coherent light may form polarized light, and the brightness may be adjusted by the second liquid crystal panel 2 of the spatial light modulator 200. The field lens module 300 and the liquid crystal grating module 400 may be configured to bend the polarized light along the second reference direction X such that there may be a certain difference in the images seen by the observer's eyes, thereby presenting a holographic three-dimensional display effect.

Figure 20:
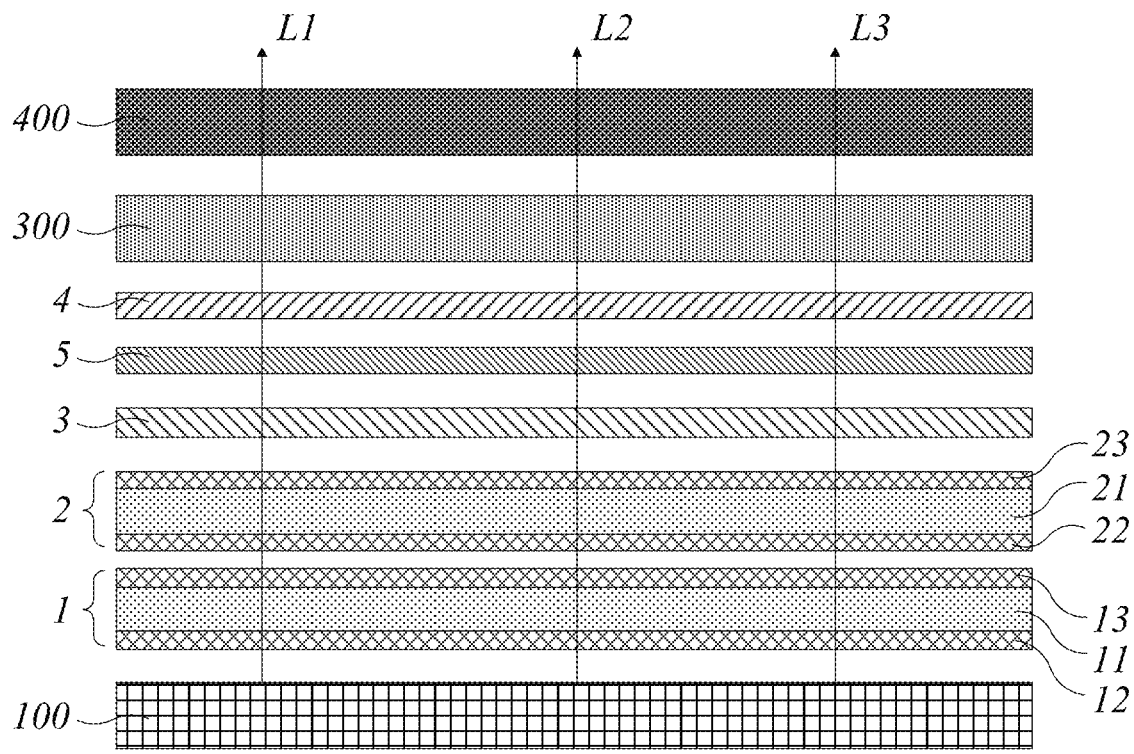
FIG. 20 illustrates another exemplary holographic three-dimensional display device according to various disclosed embodiments of the present disclosure.
Figure 21:
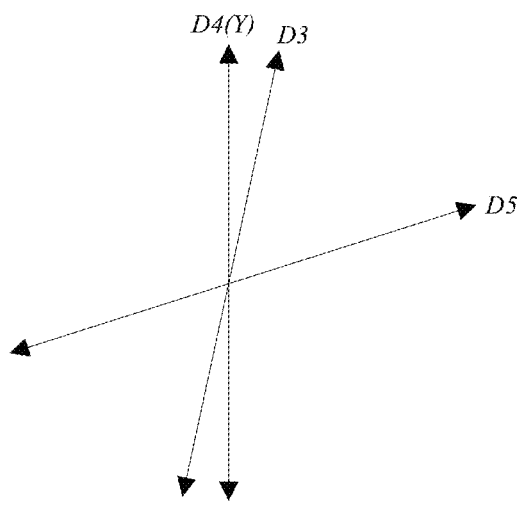
FIG. 21 illustrates a direction of an optical axis of a quarter-wave plate, a direction of an optical axis of a half-wave plate and a polarization direction of a polarizer.
Figure 22:
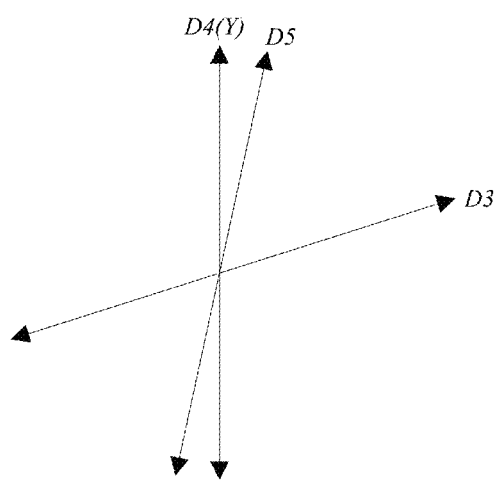
FIG. 22 illustrates a direction of an optical axis of a quarter-wave plate, a direction of an optical axis of a half-wave plate and a polarization direction of a polarizer.
Figure 23:
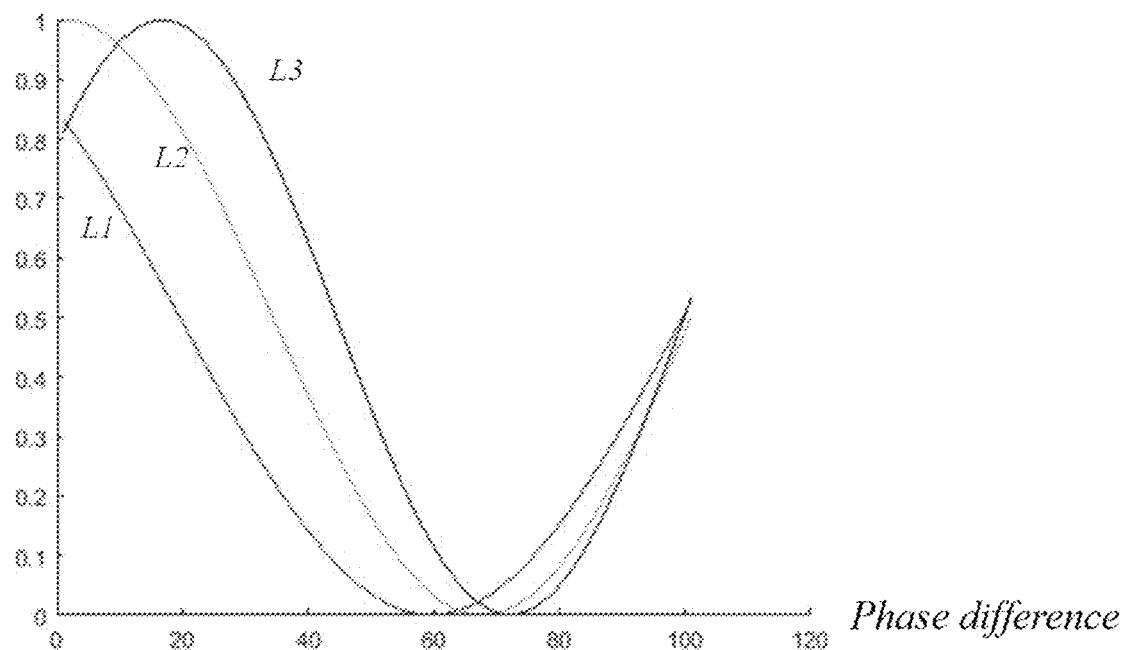
FIG. 23 illustrates another exemplary curve of light transmittance vs different phase differences of a second liquid crystal layer of an exemplary spatial light modulator according to various disclosed embodiments of the present disclosure.

FIG. 20 is another exemplary schematic diagram of a holographic three-dimensional display device according to various disclosed embodiments of the present disclosure. FIG. 21 is another exemplary schematic diagram of the optical axis direction of the quarter-wave plate, the optical axis direction of the half-wave plate and the polarization direction of the polarizer. FIG. 22 is another exemplary schematic diagram of the optical axis direction of the quarter-wave plate and the optical axis direction of the half-wave plate and the polarization direction of the polarizer. FIG. 23 is another exemplary curve showing the transmittance of light corresponding to different phase differences in the second liquid crystal layer of the spatial light modulator according to various disclosed embodiments of the present disclosure.

In some embodiments, as shown in FIG. 20-23, the spatial light modulator 200 may further include a half-wave plate 5 disposed between the quarter-wave plate 3 and the polarizer 4. Along clockwise of the normal viewing direction, the angle between the optical axis direction D3 of the quarter-wave plate 3 and the polarization direction D4 of the polarizer 4 may be approximately 75°, and the angle between the optical axis direction D5 of the half-wave plate 5 and the polarization direction D4 of the polarizer 4 may approximately 15°. In other embodiments, the angle between the optical axis direction D5 of the half-wave plate to the polarization direction D4 of the polarizer 4 may be approximately 15°, and the angle between the optical axis direction D5 of the half-wave plate 5 and the polarization direction D4 of the polarizer 4 may be approximately 75°. The two examples have been described previously and will not be repeated here.

In some embodiments, referring to FIGS. 20-23, the light source module 100 may emit at least first light L1, second light L2 and third light L3 of different colors. The second liquid crystal panel 2 may also include a plurality of first electrodes 24 and at least one second electrode 25. The plurality of first electrodes 24 and the second electrode 25 may be respectively located on both sides of the second liquid crystal layer 21 along its own thickness direction. When the voltage difference between the first electrode 24 and the second electrode 25 is 0V, the transmittance of the first light L1 in the second liquid crystal panel 2, the transmittance of the second light L2 in the second liquid crystal panel 2 and the transmittance of the third light L3 in the second liquid crystal panel 2 may be greater than a first reference transmittance.

For ease of explanation, in one embodiment of the present disclosure, the first light L1 may be red light with a wavelength of 470 nm, the second light L2 may be a green light with a wavelength of 520 nm, and the third light L3 may be a blue light with a wavelength of 630 nm. The minimum transmittance of red light, green light and blue light can reach 0%, and the maximum transmittance of red light, green light and blue light can reach 80%, so the holographic three-dimensional display device 10 can display light. When the voltage difference between the first electrode 24 and the second electrode 25 is 0V, the phase difference of the light in the second liquid crystal layer 21 may be zero, and the transmittance of red light, green light and blue light may be greater than 80%. Thus, the transmittance of the first light L1 on the second liquid crystal panel 2, the transmittance of the second light L2 on the second liquid crystal panel 2, and the transmittance of the third light L3 on the second liquid crystal panel 2 may be greater than the first reference transmittance. For example, the first reference transmittance may be approximately 80%. At this time, the holographic three-dimensional display device 10 may display a white image. That is to say, in the initial state, the holographic three-dimensional display device 10 may be at a white constant light state.

Figure 24:
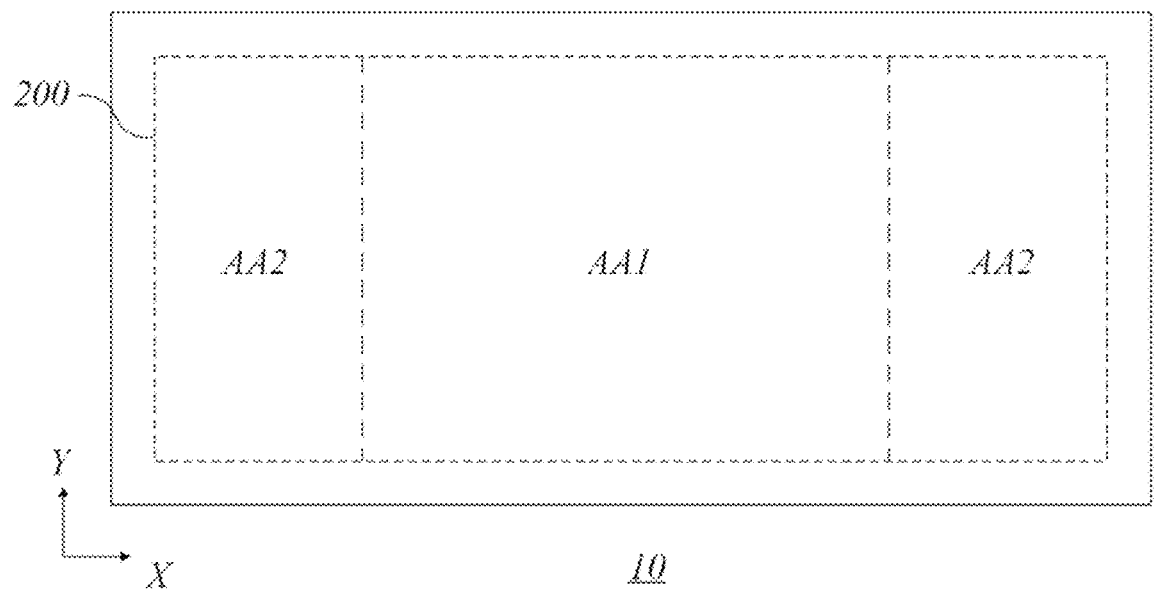
FIG. 24 illustrates another exemplary holographic three-dimensional display device according to various disclosed embodiments of the present disclosure.
Figure 25:
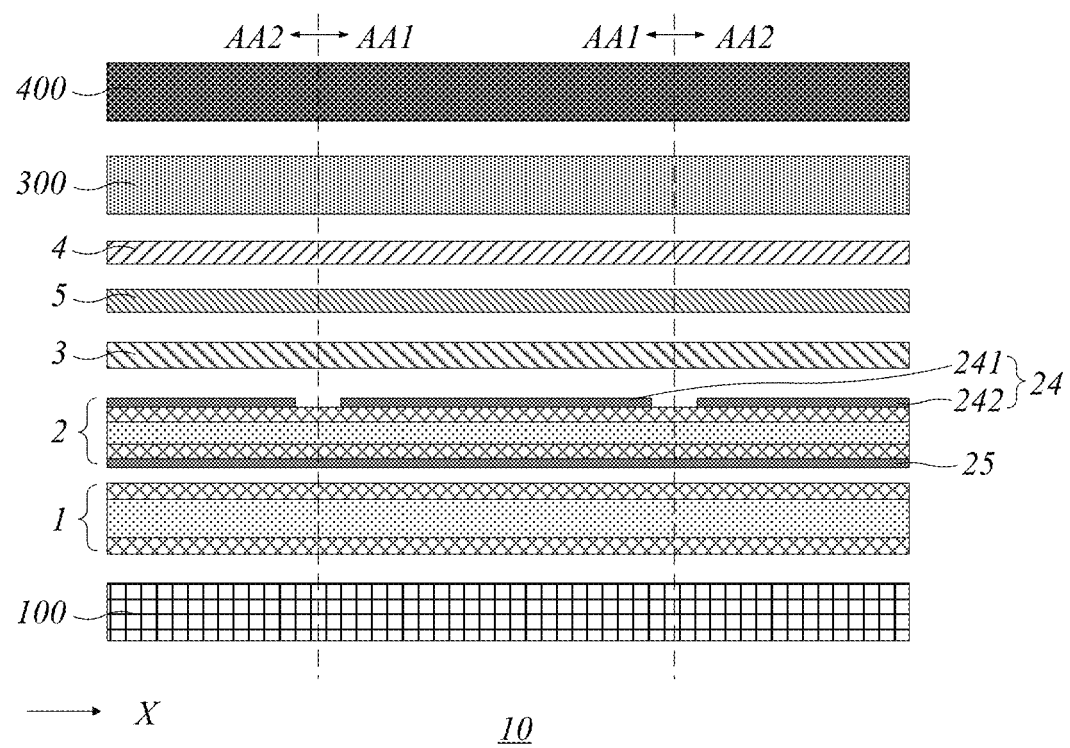
FIG. 25 illustrates another exemplary holographic three-dimensional display device according to various disclosed embodiments of the present disclosure.

FIG. 24 is an exemplary schematic diagram of a portion of the holographic three-dimensional display device according to various embodiments of the present disclosure. FIG. 25 is another exemplary structural schematic diagram of a holographic three-dimensional display device according to various disclosed embodiments of the present disclosure.

In some embodiments, as shown in FIG. 24-25, the holographic three-dimensional display device 10 may also include a first area AA1 and a second area AA2. At least a portion of the second area AA2 may be located at the positive direction side and the negative direction side of the first area AA1 in the second reference direction Y. The second liquid crystal panel 2 may also include a first electrode 24 and a second electrode 25. The first electrode 24 may include a first sub-electrode 241 and a second sub-electrode 242. The first sub-electrode 241 may be located in the first area AA1, and the second sub-electrode 242 may be located in the second area AA2. When the holographic three-dimensional display device 10 displays light, the voltage difference between the first sub-electrode 241 and the second electrode 25 may be higher than the voltage difference between the second sub-electrode 242 and the second electrode 25.

Along the second reference direction X, the second area AA2 may be located at both sides of the first area AA1. The second area AA2 may correspond to the left and right peripheral vision angles of the observer, and the first area AA1 may correspond to the normal viewing angle of the observer. In the two aforementioned embodiments, when $\Delta n \times d = 0.625\lambda 1$, and when the light corresponds to different phase differences in the second liquid crystal layer 21, the transmittance of the lights of different colors after exiting the polarizer 4 may be detected, and a curve may be plotted. The voltage difference between the first electrode 24 and the second electrode 25 may gradually increase, and the phase difference of the light in the second liquid crystal layer 21 may be inversely proportional to the transmittance. Therefore, the voltage difference between the first sub-electrode 241 and the second electrode 25 may be higher than the voltage difference between the second sub-electrode 242 and the second electrode 25, and the brightness of the second area AA2 may be greater than the height of the first area AA1. Considering that the human eye may have a poor ability to perceive the peripheral vision angle, increasing the brightness of the second area AA2 may make the brightness perceived by the human eye in the first area AA1 and the second area AA2 consistent.

Figure 26:
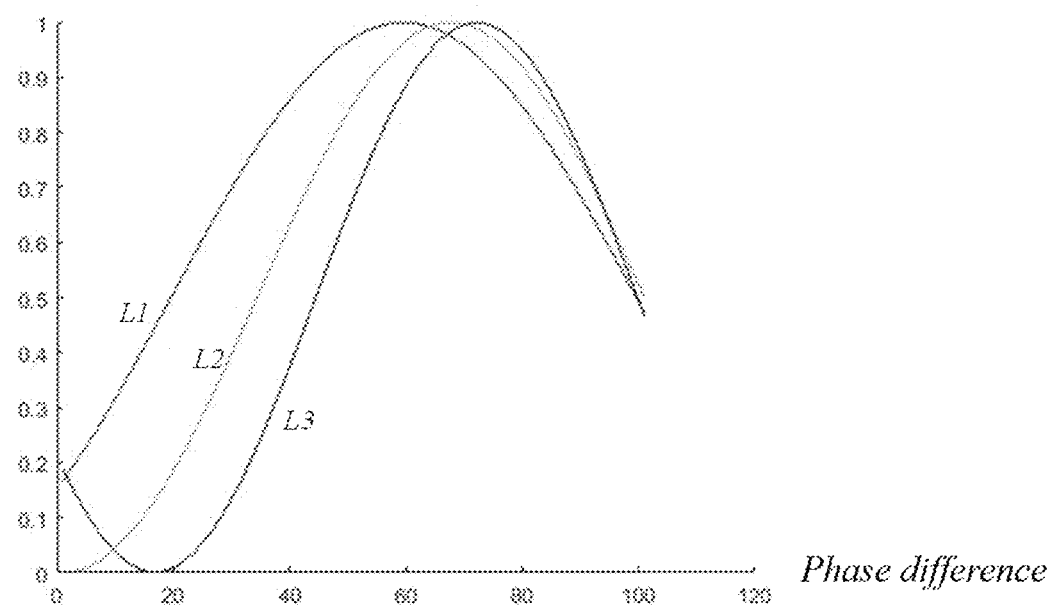
FIG. 26 illustrates another exemplary curve of light transmittance vs different phase differences of a second liquid crystal layer of an exemplary spatial light modulator according to various disclosed embodiments of the present disclosure.
Figure 27:
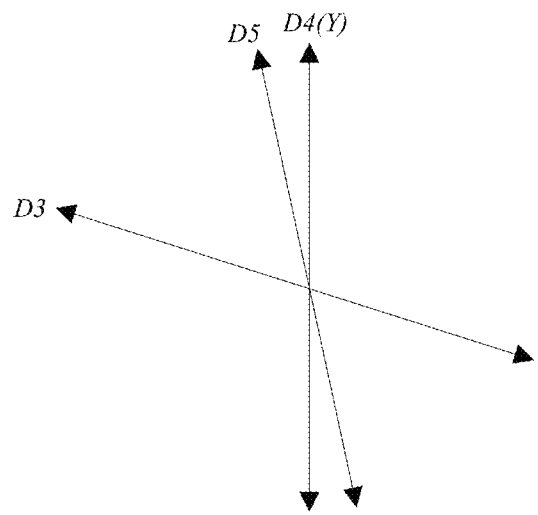
FIG. 27 illustrates a direction of an optical axis of a quarter-wave plate, a direction of an optical axis of a half-wave plate and a polarization direction of a polarizer.
Figure 28:
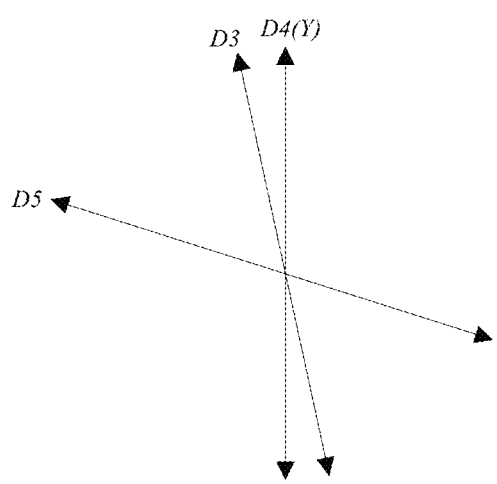
FIG. 28 illustrates a direction of an optical axis of a quarter-wave plate, a direction of an optical axis of a half-wave plate and a polarization direction of a polarizer.

FIG. 26 is another exemplary curve showing the transmittance of light corresponding to different phase differences in the second liquid crystal layer of the spatial light modulator according to various disclosed embodiments of the present disclosure. FIG. 27 is another exemplary schematic diagram of the optical axis direction of the quarter-wave plate, the optical axis direction of the half-wave plate and the polarization direction of the polarizer. FIG. 28 is another exemplary schematic diagram of the optical axis direction of the quarter-wave plate, the optical axis direction of the half-wave plate and the polarization direction of the polarizer.

In some embodiments, as shown in FIGS. 26-28, and in conjunction with FIG. 20, the spatial light modulator 200 may also include a half-wave plate 5 disposed between the quarter-wave plate 3 and the polarizer 4. Along the counterclockwise direction from the normal view direction, the angle between the optical axis direction D3 of the quarter-wave plate 3 and the polarization direction D4 of the polarizer 4 may be approximately 75°, and the angle between the optical axis direction D5 of the half-wave plate 5 and the polarization direction D4 of the polarizer 4 may be approximately 15°. In other embodiments, along the counterclockwise direction from the normal view direction, the angle between the optical axis direction D3 of the quarter-wave plate D3 and the polarization direction D4 of the polarizer 4 may be approximately 15°, and the angle between the optical axis direction D5 of the half-wave plate 5 and the polarization direction D4 of the polarizer 4 may be approximately 15°. The two examples have been described previously and will not be repeated here.

In some embodiments, continuing to refer to FIGS. 26-28 and in conjunction with FIG. 20, the light source module 100 may emit at least the first light L1, the second light L2 and the third light L3 of different colors. The second liquid crystal panel 2 may also include a plurality of first electrodes 24 and at least one second electrode 25 respectively located on both sides of the second liquid crystal layer 21 along its thickness direction. When the voltage difference is 0V, the transmittance of the first light L1 through the second liquid crystal panel 2, the transmittance of the second light L2 through the second liquid crystal panel 2 and the transmittance of the third light L3 through the second liquid crystal panel 2 may be less than the second reference transmittance.

For ease of explanation, in the embodiment of the present disclosure, the first light L1 may be red light with a wavelength of 470 nm, the second light L2 may be a green light with a wavelength of 520 nm, and the third light L3 may be a blue light with a wavelength of 630 nm. When $\Delta n \times d = 0.625 \lambda 1$, and when the light corresponds to different phase differences, the transmittance of the lights of different colors after emitting from the polarizer 4 may be measured and a curve may be plotted. The curves of the previous two embodiments may be consistent. The minimum transmittance of red light, green light and blue light may reach 20%, and the maximum transmittance of red light, green light and blue light may reach 100%. Accordingly, the holographic three-dimensional display device 10 may display light. When the voltage difference between the first electrode 24 and the second electrode 25 is 0V, the phase difference of the light in the second liquid crystal layer 21 is zero, and the transmittance of red light, green light and blue light is less than 20%. Thus, the transmittance of the first light L1 on the second liquid crystal panel 2, the transmittance of the second light L2 on the second liquid crystal panel 2, and the transmittance of the third light L3 on the second liquid crystal panel 2 may be less than a second reference transmittance. In one embodiment, the second reference transmittance may be 20%. At this time, the holographic three-dimensional display device 10 may display a black image. That is to say, in the initial state, the holographic three-dimensional display device 10 may be in a black and normally dark state.

In some embodiments, continuing to refer to FIGS. 24-25, the holographic three-dimensional display device 10 may also include a first area AA1 and a second area AA2. At least a portion of the second area AA2 may be located at the positive direction side and the negative direction side of the first area AA1 along the second reference direction X. The second liquid crystal panel 2 may also include a first electrode 4 and a second electrode 25. The first electrode 24 may include a first substrate electrode 241. The first sub-electrode 241 may be located in the first area AA1, and the second sub-electrode 242 may be located in the second area AA2. When the holographic three-dimensional display device 10 displays light, the voltage difference between the first sub-electrode 241 and the second electrode 25 may be lower than the voltage difference between the second sub-electrode 241 and the second electrode 25.

Along the second reference direction X, the second area AA2 may be located at the two sides of the first arear AA1. The second area AA2 may correspond to the peripheral viewing angles of the left and right sides of the viewer, and the first area AA1 may correspond to the normal viewing angle of viewer. In the two aforementioned embodiments, when $\Delta n \times d = 0.625 \lambda 1$ and when the light corresponds to different phase differences in the second liquid crystal layer 21, the transmittance of the lights of different colors after exiting the polarizer 4 may be measured and curves may be plotted. The voltage difference between the first electrode 24 and the second electrode 25 may gradually increase, and the phase difference of the light in the second liquid crystal layer 21 may be proportional to the transmittance. Therefore, the voltage difference between the first sub-electrode 241 and the second electrode 25 may be lower than the voltage difference between the second sub-electrode 242 and the second electrode 25. Thus, the brightness of the second area AA2 may be higher than the brightness of the first area AA1. Considering that the human eye may have a poor ability to perceive the peripheral vision angle, increasing the brightness of the second area AA2 may make the brightness perceived by the human eye in the first area AA1 and the second area AA2 consistent.

Thus, the present disclosure provides a spatial light modulator 200 and a holographic three-dimensional display device 10. The first liquid crystal panel 1 may be configured to adjust the phase of the first light L1, and the second liquid crystal panel 2 may be configured to adjust the amplitude of the first light L1. The quarter-wave plate 3 may be located on the side of the second liquid crystal panel 2 facing away from the first liquid crystal panel 1, and the polarizer 4 may be located on the side of the quarter-wave plate 3 facing away from the first liquid crystal panel 1. The first light L1 may pass through the first liquid crystal panel 1, the second liquid crystal panel 2, the quarter-wave plate 3 and the polarizer 4 in sequence, and may be emitted from the spatial light modulator 200. The external light may be formed into a polarized light after passing through the polarizer 4. After passing through the quarter-wave plate 3, the polarization direction may be rotated. After being reflected at the second liquid crystal panel 2, the polarization direction may be changed again after passing through the quarter-wave plate 3 and may be perpendicular to the polarization direction D4 of the polarizer 4, and may be difficult to transmit through the polarizer 4. Thus, the impact of external light reflected on the second liquid crystal panel 2 on the exiting light may be reduced. The difference between the refractive index of the second liquid crystal molecules 211 along the optical axis of the liquid crystal and the refractive index perpendicular to the optical axis of the liquid crystal may be Δn, the thickness of the second liquid crystal layer 21 may be d, the wavelength of the first light L1 may be λ1, and $0.5\lambda1 \leq \Delta n \times d \leq 0.75\lambda1$. When the second liquid crystal panel 2 adjusts the first light L1, on the premise that the minimum brightness of the first light L1 may not be changed much, the maximum brightness of the first light L1 may be increased; and the display effect of the holographic three-dimensional display device 10 may be enhanced.

To sum up, the present disclosure provides a spatial light modulator and a holographic three-dimensional display device, in which the first liquid crystal panel may be used to adjust the phase of the first light, and the second liquid crystal panel may be configured to adjust the amplitude of the first light. The quarter-wave plate may be located on a side of the second liquid crystal panel facing away from the first liquid crystal panel, and the polarizer may be located on a side of the quarter-wave plate facing away from the first liquid crystal panel. The first light may pass through the first liquid crystal panel, the second liquid crystal panel, the quarter-wave plate and the polarizer in sequence, and then emit from the spatial light modulator. The external light may be formed into polarized light after passing through the polarizer. After passing through the quarter-wave plate, the polarization direction may be rotated. After being reflected at the second liquid crystal panel, the polarization direction may be rotated again after passing through the quarter-wave plate. The polarization direction of the polarizer may be vertical, making it difficult to transmit through the polarizer, which may reduce the impact of external light reflected on the second liquid crystal panel on the exiting light. The difference between the refractive index of the second liquid crystal molecules along the optical axis of the liquid crystal and the refractive index perpendicular to the optical axis of the liquid crystal may be Δn, the thickness of the second liquid crystal layer may be d, the wavelength of the first light may be λ1, and 0.5λ1≤Δn×d≤0.75λ1. When the second liquid crystal panel adjusts the first light, the maximum brightness of the first light may be increased while keeping the minimum brightness of the first light unchanged. Thus, the display effect of the holographic three-dimensional display device may be improved.

The above are only specific embodiments of the present disclosure, but the protection scope of the present disclosure is not limited thereto. Any person familiar with the technical field can easily think of various equivalent methods within the technical scope disclosed in the present disclosure. Modification or replacement replacements shall be covered by the protection scope of this disclosure. Therefore, the protection scope of this disclosure should be subject to the protection scope of the claims.

What is claimed is:

1. A spatial light modulator, comprising:
   a first liquid crystal panel configured to adjust a phase of first light and including a first liquid crystal layer;
   a second liquid crystal panel configured to adjust an amplitude of the first light, located on one side of the first liquid crystal panel and including a second liquid crystal layer including second liquid crystal molecules having a liquid crystal optical axis;
   a quarter-wave plate located on a side of the second liquid crystal panel facing away from the first liquid crystal panel; and
   a polarizer located on a side of the quarter-wave plate facing away from the first liquid crystal panel,
   wherein the second liquid crystal panel includes a first optical axis direction, a difference between a refractive index of the second liquid crystal molecules along a direction of the liquid crystal optical axis and a refractive index perpendicular to the direction of the liquid crystal optical axis is Δn, a thickness of the second liquid crystal layer is d, a wavelength of the first light is λ1, and 0.5λ1≤Δn×d≤0.75λ1, and
   wherein:
   the first liquid crystal panel further includes a first alignment film with a first alignment direction and a second alignment film with a second alignment direction;
   the first alignment film and the second alignment film are respectively located on two sides of the first liquid crystal panel;
   the second alignment direction is parallel to a first reference direction;
   an angle between an optical axis direction of the quarter-wave plate and the second alignment direction is approximately 30°; and
   an angle between a polarization direction of the polarizer and the second alignment direction is approximately 15°.

2. The spatial light modulator according to claim 1, wherein:
   0.625λ1≤Δn×d≤0.7λ1.

3. The spatial light modulator according to claim 1, wherein:
   the first liquid crystal panel further includes a first alignment film with a first alignment direction and a second alignment film with a second alignment direction;
   the first alignment film and the second alignment film are respectively located on two sides of the first liquid crystal panel;
   the second alignment direction is parallel to a first reference direction;
   the second liquid crystal panel further includes a third alignment film having a third alignment direction and a fourth alignment film having a fourth alignment direction;
   the fourth alignment film is located on one side of the third alignment film facing away from the second alignment film; and
   an angle between the second alignment direction and the fourth alignment direction is approximately 45°.

4. The spatial light modulator according to claim 1, wherein:
   an angle between an optical axis direction of the quarter-wave plate and a polarization direction of the polarizer is approximately 45°.

5. The spatial light modulator according to claim 1, wherein:
   a central wavelength range of the quarter-wave plate is approximately 495 nm-605 nm.

6. The spatial light modulator according to claim 5, wherein:
   the wavelength λ1 of the first light satisfies 495 nm−Δλ≤λ1≤605 nm+Δλ, and Δλ is a first wavelength deviation.

7. The spatial light modulator according to claim 1, further comprising:
   a half-wave plate disposed between the quarter-wave plate and the polarizer.

8. The spatial light modulator according to claim 7, wherein:
   an angle between an optical axis direction of the quarter-wave plate and a polarization direction of the polarizer is approximately 15°; and
   an angle between an optical axis direction of the half-wave plate and the polarization direction of the polarizer is approximately 75°.

9. The spatial light modulator according to claim 7, wherein:
   an angle between an optical axis direction of the quarter-wave plate and a polarization direction of the polarizer is approximately 75°; and
   an angle between an optical axis direction of the half-wave plate and the polarization direction of the polarizer is approximately 15°.

10. The spatial light modulator according to claim 1, further comprising:
    a first color resist layer disposed between the first liquid crystal panel and the second liquid crystal panel;
    a connection layer disposed between the first color resist layer and the second liquid crystal panel; and
    a second color resist layer disposed between the connection layer and the second liquid crystal panel.

11. A holographic three-dimensional device, comprising:
    a light source module configured to emit coherent light in a timed manner;
    a beam expansion and collimation module located on a light exiting side of the light source module and configured to expand and collimate light emitted from the light source module;
    a spatial light modulator located on a side of the beam expansion and collimation module facing away from the light source module;

a field lens module located on a side of the spatial light modulator away from the light source module; and
a liquid crystal grating module configured to bend light emitted from the field lens module in a positive and/or negative direction of a second reference direction,
wherein the spatial light modulator includes:
a first liquid crystal panel configured to adjust a phase of first light and including a first liquid crystal layer;
a second liquid crystal panel configured to adjust an amplitude of the first light, located on one side of the first liquid crystal panel, and including a second liquid crystal layer including second liquid crystal molecules having a liquid crystal optical axis;
a quarter-wave plate located on a side of the second liquid crystal panel facing away from the first liquid crystal panel; and
a polarizer located on a side of the quarter-wave plate facing away from the first liquid crystal panel,
wherein the second liquid crystal panel includes a first optical axis direction, a difference between a refractive index of the second liquid crystal molecules along a direction of the liquid crystal optical axis and a refractive index perpendicular to the direction of the liquid crystal optical axis is $\Delta n$, a thickness of the second liquid crystal layer is d, the wavelength of the first light is $\lambda 1$, and $0.5\lambda 1 \leq \Delta n \times d \leq 0.75\lambda 1$, and
wherein:
the first liquid crystal panel further includes a first alignment film with a first alignment direction and a second alignment film with a second alignment direction;
the first alignment film and the second alignment film are respectively located on two sides of the first liquid crystal panel;
the second alignment direction is parallel to a first reference direction;
an angle between an optical axis direction of the quarter-wave plate and the second alignment direction is approximately 30°; and
an angle between a polarization direction of the polarizer and the second alignment direction is approximately 15°.

12. The holographic three-dimensional device according to claim 11, wherein the spatial light modulator comprises:
a half-wave plate disposed between the quarter-wave plate and the polarizer,
wherein:
in the clockwise direction of a normal view, an angle between an optical axis direction of the quarter-wave plate and a polarization direction of the polarizer is approximately 75° and an angle between the optical axis direction of the half-wave plate and the polarization direction of the polarizer is 15°; or
in the clockwise direction of the normal view, an angle between the optical axis direction of the quarter-wave plate and the polarization direction of the polarizer is approximately 15° and an angle between the optical axis direction of the half-wave plate and the polarization direction of the polarizer is approximately 75°.

13. The holographic three-dimensional device according to claim 12, wherein:
the light source module emits at least first light, second light and third light of different colors;
the second liquid crystal panel also includes a plurality of first electrodes and at least one second electrode;
the plurality of first electrodes and the at least one second electrode are respectively located on both sides of the second liquid crystal layer along its thickness direction; and
when a voltage difference between a first electrode of the plurality of first electrodes and the at least one second electrode is 0V, a transmittance of the first light in the second liquid crystal panel, a transmittance of the second light in the second liquid crystal panel and a transmittance of the third light in the second liquid crystal panel are greater than a first reference transmittance.

14. The holographic three-dimensional device according to claim 12, further comprising:
a first area; and
a second area,
wherein:
at least a portion of the second area is located on a positive direction side and a negative direction side of the first area along the second reference direction;
the second liquid crystal panel further includes a first electrode and a second electrode;
the first electrode includes a first sub-electrode and a second sub-electrode;
the first sub-electrode is located in the first area;
the second sub-electrode is located in the second area; and
when the holographic three-dimensional display device emits light, a voltage difference between the first sub-electrode and the second electrode is higher than a voltage difference between the second sub-electrode and the second electrode.

15. The holographic three-dimensional device according to claim 12, wherein:
the light source module emits at least first light, second light and third light of different colors; and
at least one of the first light, the second light and the third light has a wavelength within a central wavelength range of the half-wave plate.

16. The holographic three-dimensional device according to claim 15, wherein:
a wavelength of the first light is approximately 470 nm;
a wavelength of the second light is approximately 520 nm;
a wavelength of the third light is approximately 630 nm; and
the central wavelength range of the quarter-wave plate is 495 nm-605 nm.

17. The holographic three-dimensional device according to claim 11, wherein the spatial light modulator further comprises:
a half-wave plate disposed between the quarter-wave plate and the polarizer,
wherein:
in a counterclockwise direction of a normal view, an angle between an optical axis direction of the quarter-wave plate and a polarization direction of the polarizer is 75° and an angle between the optical axis direction of the half-wave plate and the polarization direction of the polarizer is approximately 15°; or
in the counterclockwise direction of the normal view, an angle between the optical axis direction of the quarter-wave plate and a polarization direction of the polarizer is approximately 15° and an angle between an optical axis direction of the half-wave plate and a polarization direction of the polarizer is approximately 75°.

18. The holographic three-dimensional device according to claim 17, wherein:

the light source module emits at least first light, second light and third light of different colors;

the second liquid crystal panel also includes a plurality of first electrodes and at least one second electrode;

the plurality of first electrodes and the at least one second electrode are respectively located on both sides of the second liquid crystal layer along its thickness direction; and when a voltage difference between a first electrode of the plurality of first electrodes and the at least one second electrode is 0V, a transmittance of the first light in the second liquid crystal panel, a transmittance of the second light in the second liquid crystal panel and a transmittance of the third light in the second liquid crystal panel are less than a second reference transmittance.

19. The holographic three-dimensional device according to claim 17, further comprising:

a first area; and a second area, wherein:

at least a portion of the second area is located on a positive direction side and a negative direction side of the first area along the second reference direction;

the second liquid crystal panel further includes a first electrode and a second electrode;

the first electrode includes a first sub-electrode and a second sub-electrode;

the first sub-electrode is located in the first area;

the second sub-electrode is located in the second area; and when the holographic three-dimensional display device emits light, a voltage difference between the first sub-electrode and the second electrode is lower than a voltage difference between the second sub-electrode and the second electrode.

* * * * *